United States Patent
Silvers et al.

(10) Patent No.: US 9,821,537 B2
(45) Date of Patent: Nov. 21, 2017

(54) MOISTURE BARRIER MEMBRANE FOR CONCRETE FLOORS

(71) Applicant: Traxx Corporation, Pomona, CA (US)

(72) Inventors: Craig Silvers, Newport Beach, CA (US); Chandulal Patel, Eastvale, CA (US); Gerald Francis Palys, Simi Valley, CA (US); Jon R. Hall, Long Beach, CA (US)

(73) Assignee: TRAXX CORPORATION, Pomona, CA (US)

( * ) Notice: Subject to any disclaimer, the term of this patent is extended or adjusted under 35 U.S.C. 154(b) by 15 days.

(21) Appl. No.: 15/084,382

(22) Filed: Mar. 29, 2016

(65) Prior Publication Data

US 2016/0289953 A1    Oct. 6, 2016

Related U.S. Application Data

(60) Provisional application No. 62/140,169, filed on Mar. 30, 2015.

(51) Int. Cl.
*B32B 27/00* (2006.01)
*B32B 27/30* (2006.01)
(Continued)

(52) U.S. Cl.
CPC ............ *B32B 27/304* (2013.01); *B32B 5/022* (2013.01); *B32B 9/04* (2013.01); *B32B 11/10* (2013.01); *B32B 25/10* (2013.01); *B32B 27/12* (2013.01); *B32B 27/306* (2013.01); *B32B 27/32* (2013.01); *B32B 27/40* (2013.01); *E04F 15/182* (2013.01); *B32B 2262/0276* (2013.01);
(Continued)

(58) Field of Classification Search
CPC .. B32B 5/022; B32B 5/26; B32B 7/14; B32B 27/304; B32B 2262/0276; B32B 2262/0284; B32B 2307/7246; B32B 27/12; B32B 27/306; B32B 27/40; B32B 25/10; B32B 11/10; B32B 27/32; B32B 2262/101
See application file for complete search history.

(56) References Cited

U.S. PATENT DOCUMENTS 4,338,370 A * 7/1982 Suter ................... B32B 25/10
428/421
4,702,950 A * 10/1987 Slosberg ............... B32B 27/12
156/247
(Continued)

OTHER PUBLICATIONS

*TraxxShield99™ Brochure*, http://www.traxxcorp.com/wp/wp-content/uploads/2016/04/TRAXXSHIELD99-Combined-Booklet_20160428.pdf, Jun. 1, 2015.
(Continued)

*Primary Examiner* — Gisele Ford
(74) *Attorney, Agent, or Firm* — Knobbe, Martens, Olson & Bear, LLP

(57) ABSTRACT

Moisture barrier membranes for use in flooring structures are provided. The moisture barrier membrane can suppress water vapor emission from a flooring substrate (such as a concrete floor) up to about 99% relative humidity. The moisture barrier membrane may include a top layer (e.g., a polyester layer), a rubberized copolymer bottom layer, and an optionally removable liner (e.g., polyethylene or nylon film). Methods of installing the moisture barrier membrane are provided.

15 Claims, 19 Drawing Sheets

(51) Int. Cl.
*B32B 5/02* (2006.01)
*B32B 11/10* (2006.01)
*B32B 27/12* (2006.01)
*B32B 25/10* (2006.01)
*B32B 9/04* (2006.01)
*B32B 27/40* (2006.01)
*B32B 27/32* (2006.01)
*E04F 15/18* (2006.01)

(52) U.S. Cl.
CPC . *B32B 2262/101* (2013.01); *B32B 2307/7246* (2013.01); *B32B 2471/00* (2013.01)

(56) References Cited

U.S. PATENT DOCUMENTS

| | | | |
|---|---|---|---|
| 4,828,910 A * | 5/1989 | Haussling | B29C 70/08 428/423.1 |
| 4,833,010 A * | 5/1989 | Langley | A62D 5/00 2/243.1 |
| 4,983,450 A * | 1/1991 | Yanagihara | A61F 13/5148 427/245 |
| 4,992,315 A | 2/1991 | Zickell et al. | |
| 5,965,257 A | 10/1999 | Ahluwalia | |
| 6,106,916 A * | 8/2000 | Lukowski, Sr. | B32B 27/12 428/40.1 |
| 6,576,577 B1 * | 6/2003 | Garner | B32B 5/18 428/304.4 |
| 6,673,432 B2 | 1/2004 | Kiik et al. | |
| 6,858,550 B2 | 2/2005 | Ahluwalia | |
| 7,037,864 B2 * | 5/2006 | Faucher | B32B 11/10 428/489 |
| 7,096,630 B1 * | 8/2006 | Keene | E04F 15/20 52/302.1 |
| 7,437,855 B2 | 10/2008 | Locke et al. | |
| 7,491,438 B2 * | 2/2009 | Demott | D04H 1/48 428/95 |
| 8,171,687 B2 | 5/2012 | Dellinger et al. | |
| 8,536,077 B2 * | 9/2013 | LaVietes | B32B 27/12 442/123 |
| 2002/0037405 A1 | 3/2002 | Naipawer, III et al. | |
| 2002/0187300 A1 * | 12/2002 | Nakasuji | B32B 5/26 428/95 |
| 2004/0048036 A1 * | 3/2004 | Nakasuji | B32B 5/26 428/95 |
| 2006/0089073 A1 * | 4/2006 | Sobieski | B32B 3/266 442/394 |
| 2009/0320987 A1 * | 12/2009 | Hubbard | B32B 7/06 156/71 |
| 2011/0061720 A1 * | 3/2011 | Watanabe | B32B 25/08 136/246 |
| 2011/0097954 A1 * | 4/2011 | Bone | B32B 7/06 442/1 |
| 2012/0244340 A1 * | 9/2012 | Peng | B32B 27/08 428/327 |
| 2013/0061906 A1 * | 3/2013 | Watanabe | B32B 27/20 136/244 |
| 2014/0234563 A1 * | 8/2014 | Bone | B32B 7/12 428/41.8 |
| 2015/0210042 A1 * | 7/2015 | Tapio | B32B 7/12 428/337 |
| 2016/0200078 A1 * | 7/2016 | Arakawa | B32B 5/022 442/394 |

OTHER PUBLICATIONS

*TraxxShield99™ Installation Instructions*, http://www.traxxcorp.com/wp/wp-content/uploads/2016/04/TRAXXSHIELD99-installation-instructions_20160428.pdf, Sep. 2015.
*TraxxShield99™ Acclimation Precautions & Cold Temperatures*, http://www.traxxcorp.com/wp/wp-content/uploads/2015/12/Traxxshield99-acclimation-and-cold-temps_20151218.pdf , Dec. 2015.
*TraxxShield99™ Warranty*, http://www.traxxcorp.com/wp/wp-content/uploads/2015/06/TRAXXSHIELD99-Warranty_20150601.pdf, Jun. 1, 2015.
*TraxxShield99™ Frequently Asked Questions*, http://www.traxxcorp.com/wp/wp-content/uploads/2015/06/TRAXXSHIELD99-faqs.pdf, Jun. 2015.
*TraxxShield99™ Approved List of Floorcoverings*, Dec. 2015.
*TraxxShield99™ Article Changing the Paradigm in Concrete Moisture Remediation*, http://www.traxxcorp.com/wp/wp-content/uploads/2015/06/TraxxShield99-FCI-20150620.pdf, Jun. 20, 2015.
*TraxxShield99™ Primer Bulletin*, http://www.traxxcorp.com/wp/wp-content/uploads/2015/12/TraxxShield99-primer-bulletin_20151218.pdf, Dec. 2015.
*TraxxShield99™ Primer Tech Data*, http://www.traxxcorp.com/wp/wp-content/uploads/2015/12/TraxxShield99-Primer-Tech-Data.pdf, Dec. 3, 2015.
*TraxxShield99™ Adhesive Bulletin*, http://www.traxxcorp.com/wp/wp-content/uploads/2015/09/TraxxShield99-Adhesive-Bulletin_20150807.pdf, Aug. 7, 2015.
*TraxxShield99™ Installation Over Gypsum*, http://www.traxxcorp.com/wp/wp-content/uploads/2015/09/Traxxshield99-Bulletin-Installation-Over-Gypsum.pdf, Sep. 2015.
*TraxxShield99™ Installation of Solid Wood Over Sleeper Floors*, http://www.traxxcorp.com/wp/wp-content/uploads/2015/09/TraxxShield99-Bulletin-Installation-of-Solid-Hardwood-Over-Sleeper-Floors.pdf, Sep. 2015.
*TraxxShield99™ Loose-Lay Bulletin*, http://www.traxxcorp.com/wp/wp-content/uploads/2015/09/Traxxshield99-Bulletin-Loose-Lay_20150915.pdf, Sep. 2015.
*TraxxShield99™ Installation Over Wood Subfloors Bulletin*, http://www.traxxcorp.com/wp/wp-content/uploads/2015/10/TRAXXSHIELD99-installation-over-wood-subfloors.pdf, Oct. 2015.
*TRAXXSHIELD99™ Features and Benefits*, http://www.traxxcorp.com/wp/wp-content/uploads/2015/06/TRAXXSHIELD99-features-benefits.pdf, Jun. 2015.
*TRAXXSHIELD99™ Typical Performance Properties*, http://www.traxxcorp.com/wp/wp-content/uploads/2016/02/TraxxShield99-Performance-Properties.pdf, Dec. 2015.
*TraxShield99™ Promo*, https://www.youtube.com/watch?v=Q-KBvxvzGLg, Dec. 9, 2015.
*TraxShield99™ Installation Instructions*, https://www.youtube.com/watch?v=3m7TY9Z-9fw&feature=youtu.be, Dec. 21, 2015.
*VersaShield MBX*, http://www.shawhardsurface.com/content/static_pdfs/SHS_VersaShield_MBX_Tearsheet_112114.pdf, Nov. 21, 2014.

* cited by examiner

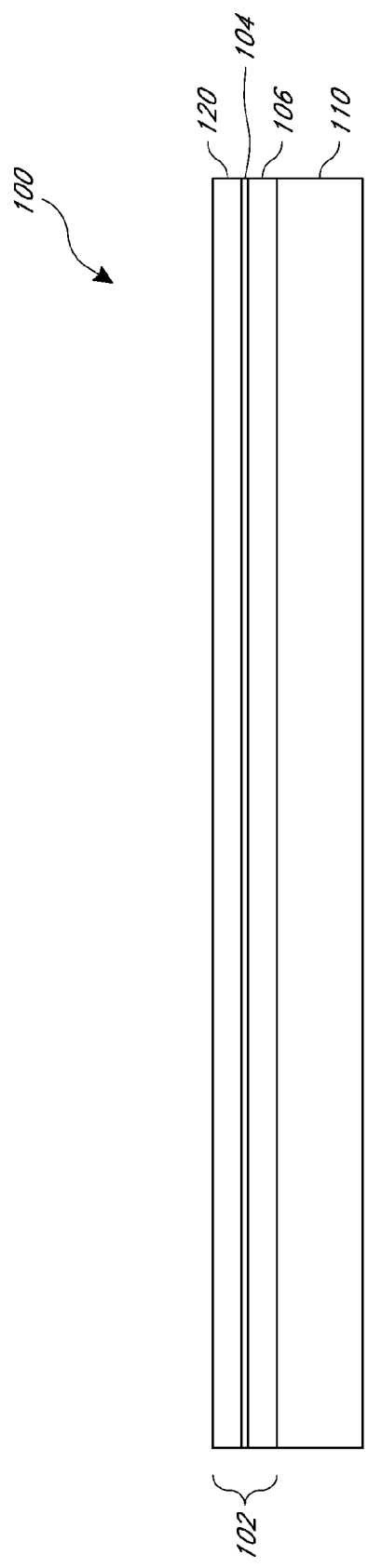

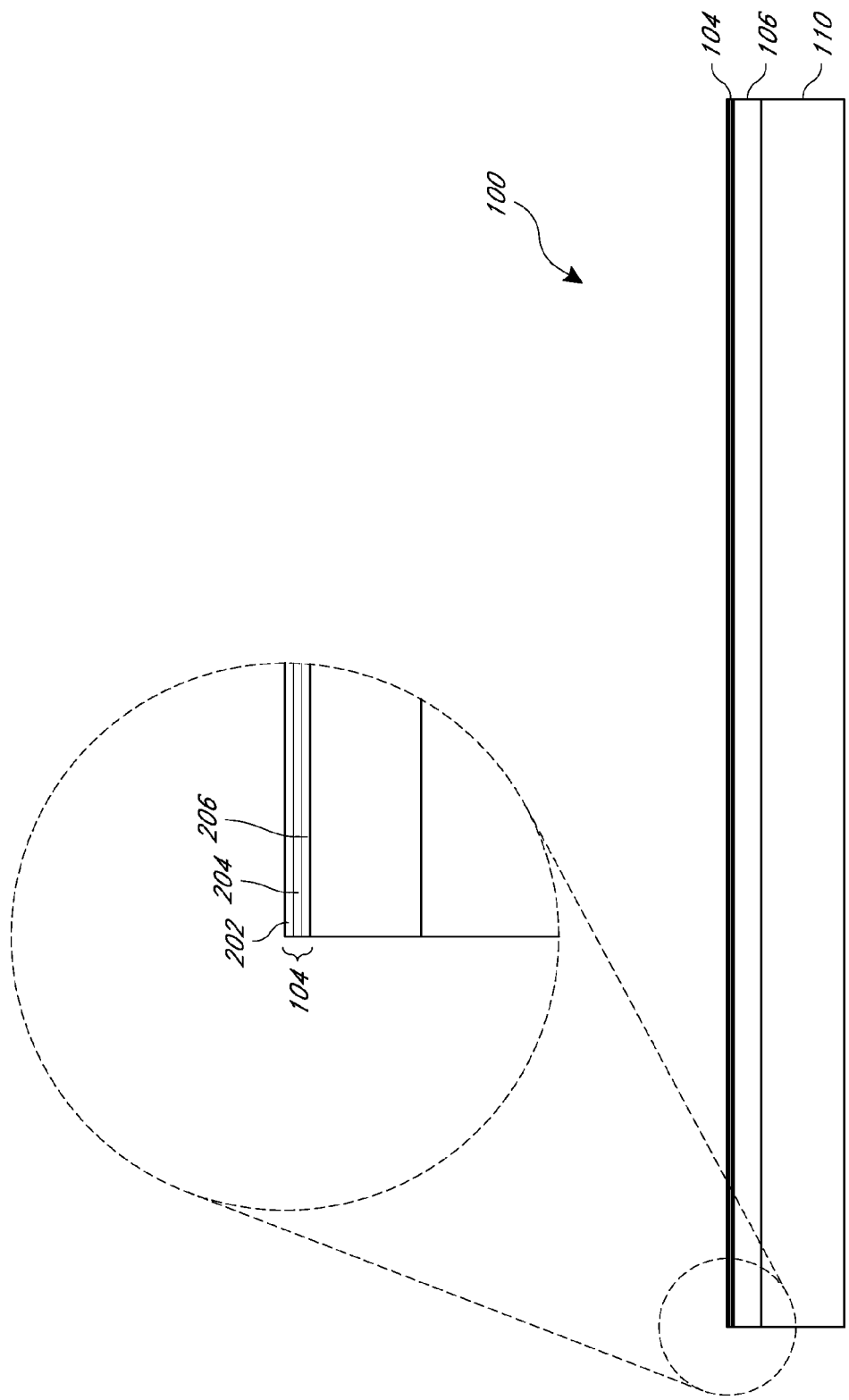

MOISTURE BARRIER MEMBRANE FOR CONCRETE FLOORS

CROSS-REFERENCE TO RELATED APPLICATIONS

This application claims the benefit of priority to U.S. patent application Ser. No. 62/140,169, filed Mar. 30, 2015, entitled "Rolled Moisture Barrier which Suppresses Moisture Vapor Emission from Concrete Floors," which is hereby incorporated by reference herein in its entirety.

BACKGROUND

Field

The disclosure relates generally to moisture barrier membranes that suppress moisture vapor emission from flooring structures and in particular that suppress moisture vapor emission from concrete floors.

Description of the Related Art

Moisture is present as vapor in all concrete floors. As moisture vapor rises from the concrete, it can degrade adhesion of floor coverings, which are adhered to the concrete. Once the adhesion or floor coverings degrade, the floor coverings may lift, crack, or ooze water, thereby damaging the flooring structure.

SUMMARY

Moisture barrier membranes for use in flooring structures are provided. The moisture barrier membrane can suppress water vapor emission from a flooring substrate (such as a concrete floor) up to about 99% relative humidity. The moisture barrier membrane may include a top layer (e.g., a non-woven fabric layer), a rubberized copolymer bottom layer, and an optionally removable liner (e.g., polyethylene or nylon film). Methods of installing the moisture barrier membrane are provided.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1A is a side view of an embodiment of a flooring structure comprising a moisture barrier membrane.

FIG. 2A is a side view of an embodiment of a flooring structure comprising a moisture barrier membrane.

Figure 1B:
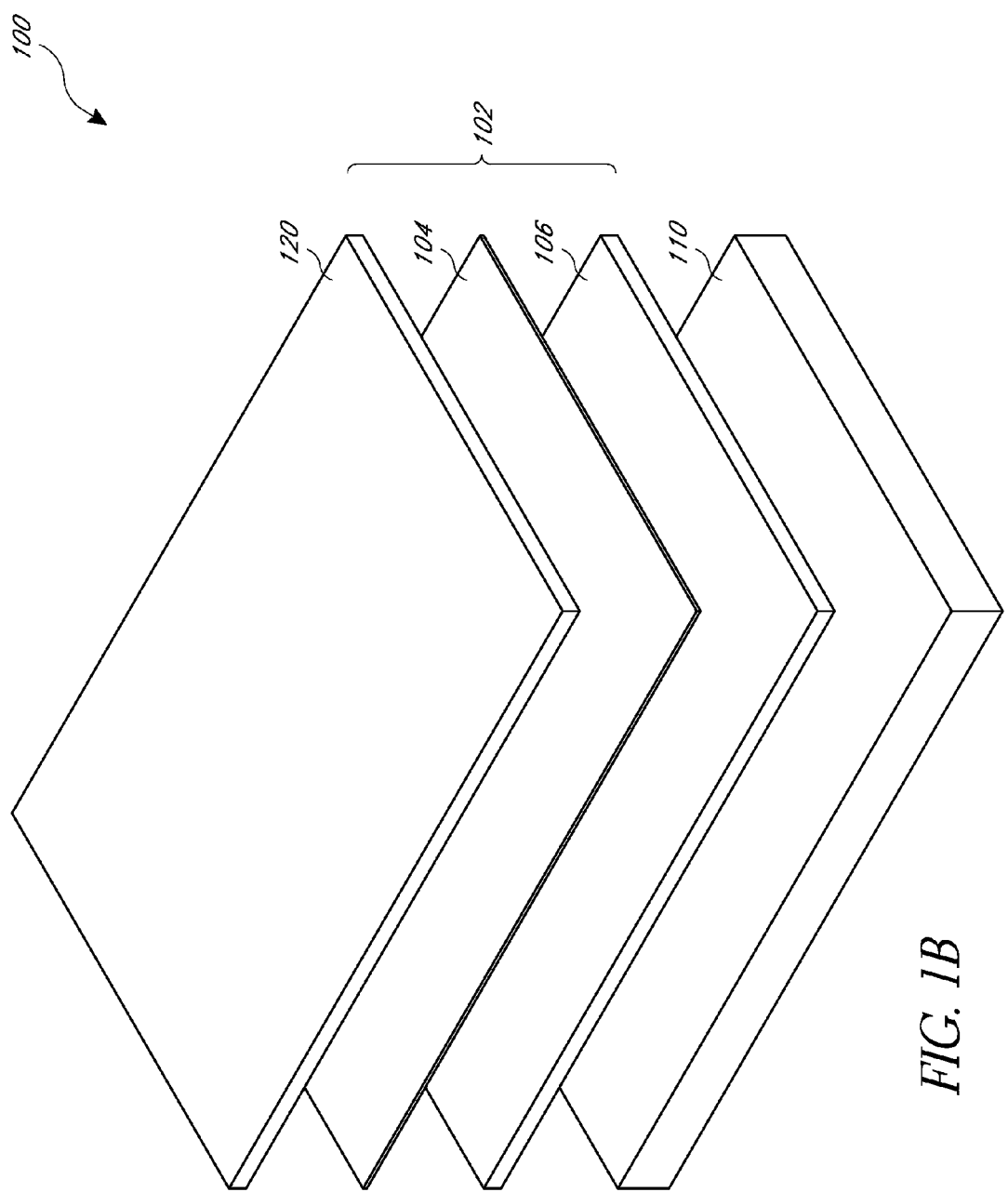
FIG. 1B is an exploded view of an embodiment of a flooring structure comprising a moisture barrier membrane.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Traditionally, moisture barriers have been used in several contexts. For example, moisture barriers have been used as a means of waterproofing. Generally, a builder can install a moisture barrier on a roof to prevent rain, humidity, or other moisture from seeping in from the top. Without a moisture barrier installed, water that collects on a roof would flow in a downward direction, through cracks or openings in roofing tiles, slats, and/or other roofing material and into the house or building. In contrast, the moisture barrier disclosed herein can suppress the upwards flow of moisture from a flooring structure (e.g., a concrete floor). The moisture barrier disclosed herein can further dampen ambient noise and acoustics in a room above the flooring structure.

In traditional methods of installing flooring in commercial buildings, residential homes, apartment complexes, and/or other building structures, many issues may arise pre-installation, during installation, and/or post-installation. Similarly, many problems may arise when no moisture barrier is used, a minimally effective moisture barrier is used, and/or a moisture barrier is improperly used during the installation of a flooring structure.

In many circumstances when there is any form of precipitation, humidity, and/or other moisture in the air, moisture will settle in the ground. From the ground the moisture can seep into cracks and/or pores of the foundation of a building. Later, the moisture can rise into the flooring substrate material in a building, such as concrete, wood, and/or the like. Moisture can be present as vapor in many types of flooring substrates, including porous and non-porous materials.

As water vapor rises through the flooring substrate, the water vapor can degrade the adhesion of a floor covering material, such as ceramic tile, vinyl, linoleum, rubber tile, and/or the like. Once the adhesive that adheres the floor covering to the other components of the flooring structure degrades, water vapor transmission at various levels, such as greater than, equal to, and/or less than 75% relative humidity, can cause the floor covering to lift, crack, and/or ooze water, which damages the floor covering, and may require expensive replacement of the floor covering.

Accordingly, in some circumstances, without a moisture barrier such as the moisture barrier membranes disclosed herein, finished flooring may not be installed in a smooth, flat, and/or properly oriented manner and may ultimately de-adhere from the flooring substrate. The same problems can arise in traditional methods in which a moisture barrier merely floats on (e.g., is placed over but not adhered to) the flooring foundation surface. Therefore, in certain embodiments, embodiments of the moisture barrier membranes disclosed herein are fully adhered to a surface of the flooring substrate.

Embodiments of a moisture barrier membrane described in more detail below can help to suppress moisture in a flooring structure to prevent cracking, fracturing, lifting, and/or fracturing of any layer of a flooring structure and/or reduce moisture build up. Embodiments of the moisture barrier membrane may also dampen sound transmission through the flooring substrate, thereby providing for a quieter environment in the room where the membrane is installed as well as nearby rooms. Embodiments of the moisture barrier membrane may also absorb stress and provide thermal insulation, and reduce foot discomfort from standing or walking on the floor.

Example General Flooring Installation

With reference to FIG. 1A, when an installer or builder builds a commercial or residential building and installs a flooring structure, the material chosen for each layer of the flooring structure can be an important consideration. Depending on the material of the flooring substrate 110 in a flooring structure 100, it can be advantageous to use a moisture barrier membrane in the flooring structure. For example, porous and even non-porous flooring substrates 110 can include moisture vapor. Over time, moisture vapor can be transmitted through the flooring substrate 110 and can rise. When moisture vapor transmits through the flooring substrate 110 too quickly or builds up, the adhesive that retains a floor covering to the flooring substrate 110 may become compromised. Accordingly, moisture vapor build-up underneath the floor covering can crack and/or delaminate the floor covering or strip the flooring structure of its adhesives.

Generally, the moisture barrier membranes described herein, can significantly improve the quality, integrity, and longevity of a flooring structure. In some embodiments, moisture barrier membrane can advantageously reduce fractures, suppress moisture in a flooring structure, and/or enhance acoustic properties (by dampening sound transmission) of the flooring structure. Moisture barrier membrane can also help to reduce or minimize fungus and/or mold growth in the flooring structure as tested according to ASTM D3273 (ASTM International, West Conshohocken, Pa.).

Examples of the Moisture Barrier Membrane

FIG. 1A illustrates an example of a flooring structure 100. The flooring structure 100 can include a floor covering 120, a moisture barrier membrane 102 and a flooring substrate 110. The floor covering 120 can comprise wood flooring (solid or engineered), tile flooring, vinyl flooring, ceramic flooring, laminate flooring, carpet, porcelain, stone, screed, cushioning or underlayment, or any other type of flooring material. The flooring substrate 110 can comprise concrete, wood, gypsum, or any other type of building flooring substrate. The flooring substrate 110 may include one or more coatings such as sealers, primers, paint, thin-set, patching materials, curing agents, and so forth. For example, a latex-based primer can be applied to a concrete surface to set dust and promote better adhesion of the membrane 102 to the substrate 102. The flooring substrate 110 can comprise a foundation, a slab (on-grade or below-grade), a subfloor, or any other type of building substrate. The flooring substrate can include a radiant floor system.

The moisture barrier membrane 102 can comprise one, two, three, four, five, six, seven, eight, nine, and/or ten or more layers. For example, the moisture barrier membrane 102 can comprise a top layer 104 and a bottom layer 106. Moisture barrier membrane 102 can also comprise a liner 108 (illustrated in FIG. 1C) disposed below the bottom layer 106. The liner 108 may be removed to expose a surface of the bottom layer 106 for adhesion of the membrane 102 to the flooring substrate 110. Some embodiments of the moisture barrier membrane 102 can require all of the top layer 104, bottom layer 106, and liner 108.

Figure 1C:
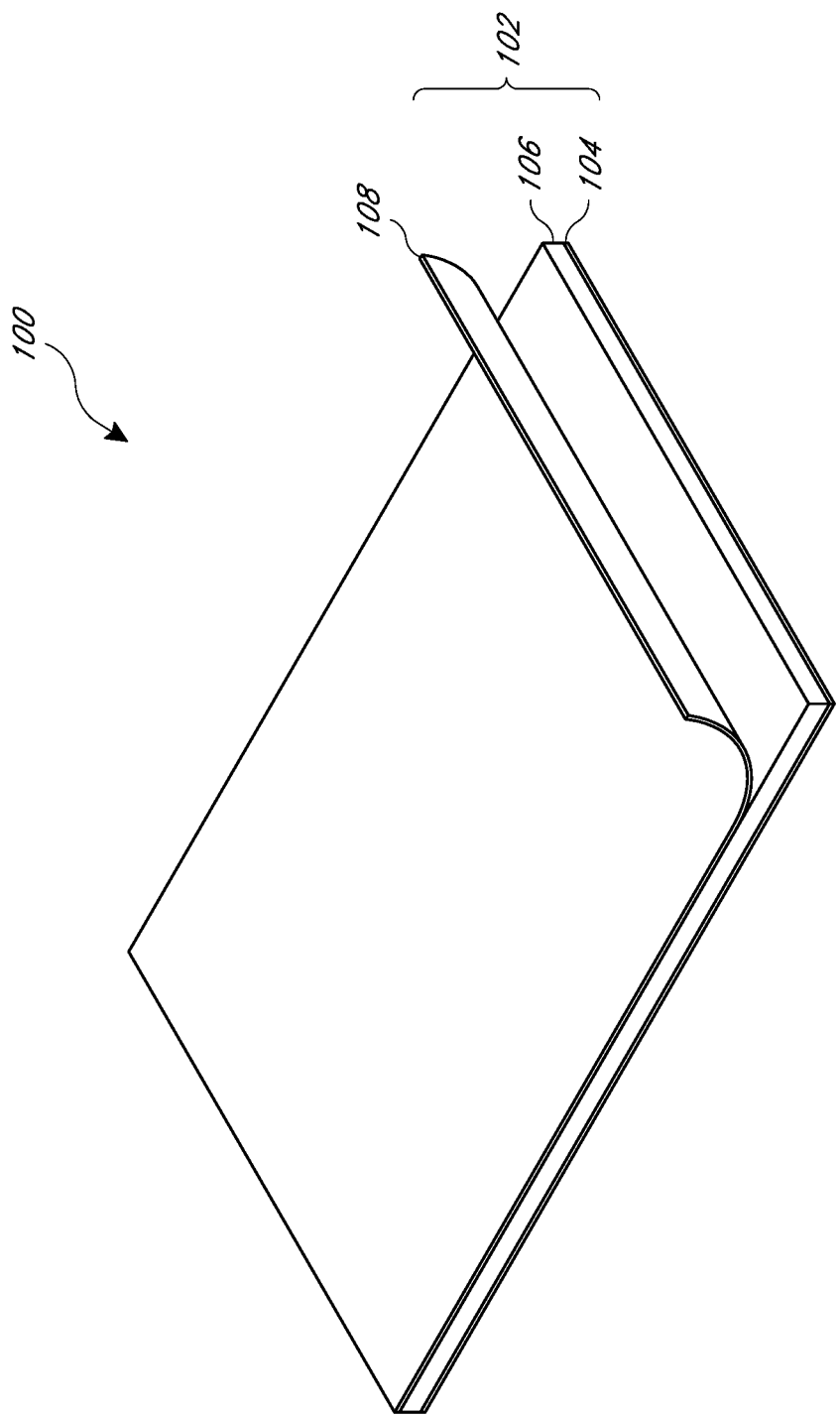
FIG. 1C is a perspective view of an embodiment of a flooring structure comprising a moisture barrier membrane.

FIG. 1B shows an exploded view of an example of the flooring structure 100 comprising the top layer 104 and the bottom layer 106 of the moisture barrier membrane 102 and the flooring substrate 110. The floor covering 120 can be disposed over the top layer 104. FIG. 1C illustrates another embodiment of the moisture barrier membrane 102. In this example, the liner 108 is adjacent the bottom layer 106 and can be peeled back and/or partially removed from the moisture barrier membrane 102 to expose a bottom surface of the bottom layer 106 of the membrane 102. The liner 108 can protect the bottom surface, which may be tacky or sticky to assist in adhering the bottom surface of the bottom layer 106 to the flooring substrate 110. As further described below, the liner 108 may optionally be removed prior to installation of the membrane 102 over the flooring substrate 110.

Generally, the moisture barrier membrane 102 can be manufactured using various construction methods. For example, moisture barrier membrane 102 can be manufactured by high speed lamination. In some examples, layers of the moisture barrier membrane 102 can be fed separately from respective master rolls into laminating equipment to be laminated. Once the layers of the moisture barrier membrane 102 are laminated, the moisture barrier membrane 102 can be rolled and/or cut to form a finished product.

The moisture barrier membrane 102 can include various sized pieces. For example, each piece of the moisture barrier membrane 102 can have a width of approximately 3 feet and a length of approximately 66.6 feet. Accordingly, the moisture barrier membrane 102 can have a surface area of 200 square feet. In other examples, the moisture barrier membrane 102 can include a width in a range of 1 to 5 feet, 5 to 10 feet, or more and a length in a range of 10 to 100 feet, 100 to 250 feet, or more. The moisture barrier membrane 102 can be cut into various shapes and sizes. The moisture barrier membrane 102 can be rolled into a roll (see, e.g., the examples in FIG. 4A or 4B) to ease storage or transportation. The roll can be unrolled during installation of the membrane 102 (see, e.g., the example installation stage in FIG. 5A).

In some examples, the moisture barrier membrane 102 can weigh approximately 27.1 pounds per 100 square feet. However, the weight of the moisture barrier membrane 102 can change depending on the composition of each layer and the thickness of each layer. Overall, in other examples, the moisture barrier membrane can weigh approximately 1.0-2.0 kilograms per square meter. In other examples, the moisture barrier membrane can weigh approximately 0.5 to 3.0 kilograms per square meter or more.

Each layer of the moisture barrier membrane 102 can have a suitable thickness to provide the moisture barrier (or other) properties described herein. Each layer may, but need not, have a different thickness from the other layers in the membrane. Generally, the thickness of each layer of the membrane is substantially uniform across the membrane. For example, the moisture barrier membrane 102 can have a thickness of 40 mil (1 mil is 0.001 inches or approximately 0.0254 mm). In other embodiments, the moisture barrier membrane 102 can have a thickness in a range from 5 mil to 50 mil, 50 mil to 100 mil, 100 mil to 250 mil, or more. The thickness of the moisture barrier can be adjusted to provide a desired amount of sound dampening.

Some configurations of the moisture barrier membrane 102 have enhanced moisture suppression properties. A permeability rate (sometimes shortened to a perm rate or referred to as a permeance) can measure the ability of a material to suppress the diffusion or transmission of water vapor. As a result, a low permeability rate may be advantageous in flooring structures, as a lower permeability rate indicates increased ability to suppress moisture vapor. Permeability may be measured in perms, where 1 perm is 1 grain of water vapor per square-foot per hour per inch of mercury (grain $h^{-1}$ $ft^{-2}$ in $Hg^{-1}$). One grain of water vapor has a mass of 64.8 milligrams. The perm rate can be used to compare the effectiveness of moisture barrier membrane 102. Examples of moisture barrier membrane 102 can have a perm rate of approximately 0.05 perms. In some examples, moisture barrier membrane 102 can have a perm rate in a range of 0.005 to 0.5 perms, 0.01 to 0.1 perms, or some other range. The perm rate of the moisture barrier membrane 102 can be measured according to ASTM E96-14 testing methods for vapor transmission of materials. The perm rate can be measured with the liner on or the liner off.

Some embodiments of the moisture barrier membrane 102 can prevent the transmission of water vapor having a pH of up to about 12. As a result, the moisture barrier membrane can advantageously prevent alkalinity, re-emulsification of adhesive, mold, mildew, and/or additional flooring damage caused by the moisture.

The moisture barrier membrane 102 can also meet certain requirements relating to its ability to handle conditions in a fire. In some examples, the moisture barrier membrane can have a flame spread of approximately 0.82 $W/cm^2$ according to testing under the ASTM E648 standard. In some examples, the moisture barrier membrane can have a smoke density less than 450 according to ASTM E662 testing.

The properties of the moisture barrier membrane 102 can advantageously prevent cracks from occurring in the flooring substrate 110 and/or in a floor covering. As an example, the moisture barrier membrane 102 can prevent reflective cracking, which can occur when cracks in the flooring substrate 110 ripple through the flooring structure and causes cracks in the floor covering (e.g., cracks in ceramic tile).

In another example, as newly installed flooring substrate 110 cures, the tendency for the flooring substrate 110 to crack increases. Even when the flooring substrate 110 has cured for a sufficient period of time, the flooring substrate 110 can still comprise a relative humidity (RH, a ratio of partial pressure of water vapor to the equilibrium vapor pressure of water at the same temperature) of at least 97% in some instances. Thus, any further drying can propagate additional cracking.

The moisture barrier membrane 102 can help to control the expansion and contraction of the cracks in the flooring substrate 110 during this time. Application of the moisture barrier membrane 102 to the flooring substrate 110 can cause the relative humidity levels of the flooring substrate 110 to slowly decrease as the moisture dries or gases off at the perimeter of the moisture barrier membrane. Accordingly, the moisture barrier membrane 102 can advantageously reduce cracks in the flooring substrate 110, floor covering and/or the flooring structure 100 by suppressing the emission of water vapor in the flooring substrate 110.

The moisture barrier membrane 102 can advantageously prevent fracturing in installations of certain types of the floor covering, such as in the installation of ceramic tile. For example, the moisture barrier membrane can provide strength and flexibility to bridge and/or compress horizontal and/or vertical cracks without transferring the stress load caused by the cracks to the floor covering. Some examples of the moisture barrier membrane can attain an 'Extra Heavy' rating in the Robinson Floor Test according to ASTM C627.

The moisture barrier membrane 102 can also provide enhanced acoustics properties. Generally, there are several types of issues caused by sound in a flooring structure, including reflective sound and impact sound transmission. Reflective sound is considered the sound that bounces off of or reflects off of the flooring structure. Impact sound can be considered the sound that travels through the flooring structure and can be heard from the level below. In one example, the thickness of the moisture barrier membrane can dampen and/or deaden both reflective sound and impact sound.

In some examples, the moisture barrier membrane 102 can have a sound transmission loss of approximately 53 per ASTM Standard E90-09 testing. The sound transmission loss can indicate the effectiveness of the moisture barrier membrane in sound proofing the flooring structure and reducing the amount of sound transmitted between floors in a building. In further examples, the moisture barrier membrane 102 can have an impact insulation class of approximately 49 per ASTM Standard E989-06 (2012) testing. Similarly, the impact insulation class can indicate the effectiveness of the moisture barrier membrane in sound proofing the flooring structure and reducing the amount of sound transmitted between floors in a building. Generally, test results achieving a minimum of 50 for sound transmission loss and 50 for impact insulation class indicate that the material being tested has effective sound transmission reduction properties. Accordingly, the moisture barrier membrane can be a very effective sound dampener.

In some examples, the moisture barrier membrane 102 can have a delta impact insulation class of approximately 20 per ASTM E2179-03 (2009) testing ("Standard Test Method for Laboratory Measurement of the Effectiveness of Floor Coverings in Reducing Impact Sound Transmission Through Concrete Floors"). The delta impact insulation class of approximately 20 can be calculated according to ASTM E989-06 (2012) ("Standard Classification for Determination of Impact Insulation Class (IIC)"). As a result, the moisture barrier membrane 102 can have superior acoustic dampening properties compared to traditional moisture barriers.

Examples of the Top Layer

Figure 2B:
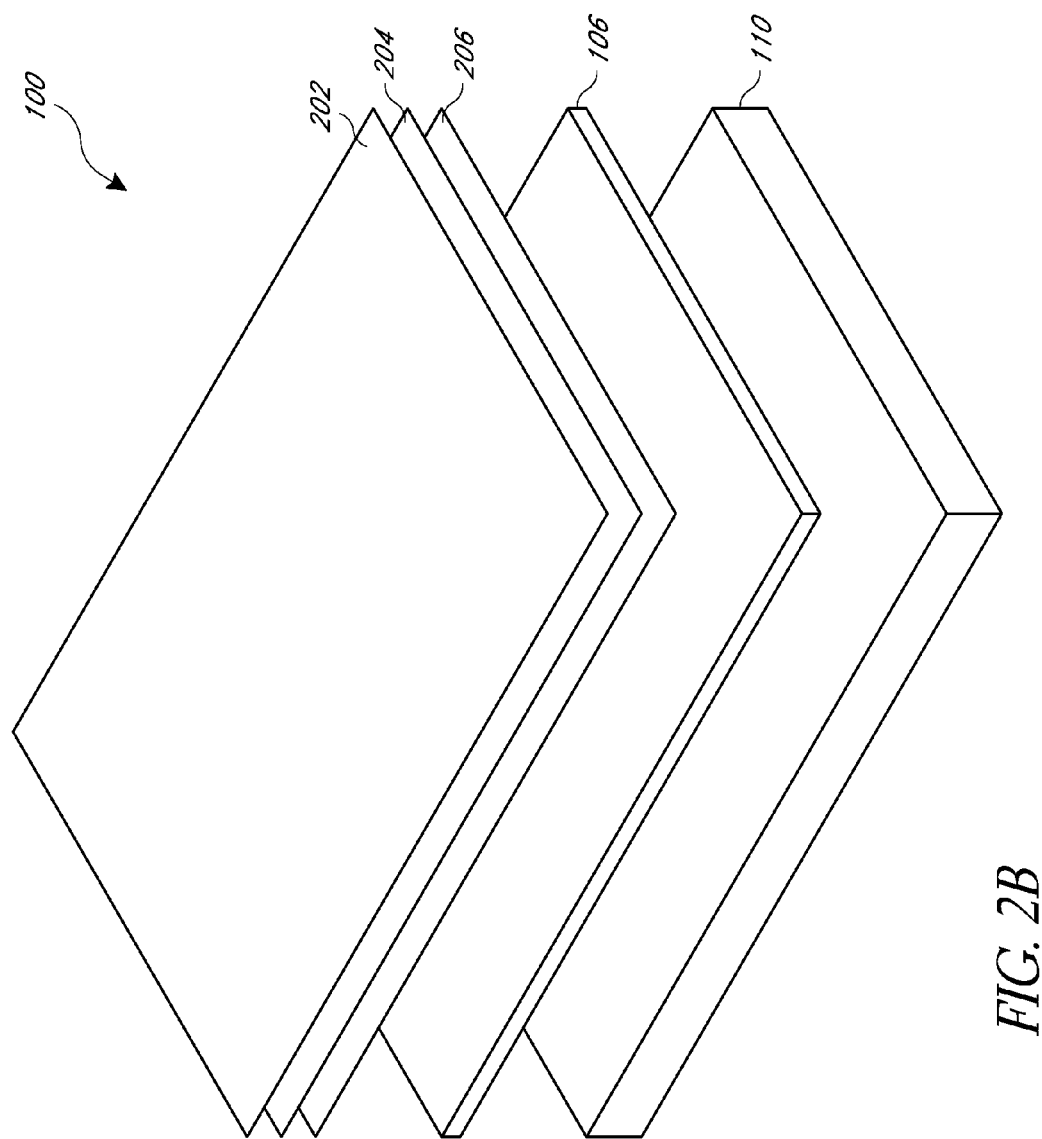
FIG. 2B is an exploded view of an embodiment of a flooring structure comprising a moisture barrier membrane.

As shown in FIGS. 1A-1C and 2A-2D, the membrane 102 can include a top layer 104. The top layer 104 can include one or a plurality of layers (sometimes referred to as a ply or plies). An example of the top layer 104 can have one or two or more layers. Some embodiments of the top layer 104 can have one, two, three, four, five, six, seven, eight, nine, and/or ten or more layers. For example, the top layer 104 can include a first ply 202 and a second ply 206. With reference to FIG. 2A, the top layer 104 can include the first ply 202, the second ply 206, and a central layer 204 disposed between the first ply 202 and the second ply 206. The top layer can have a thickness of approximately 4 to 5 mils. In other embodiments, the top layer can have a thickness in a range from approximately 0.1 to about 20 mils, 1 to 10 mils, or some other range.

In an example membrane 102, each of the first ply 202, the central layer 204, and the second ply 206 can have approximately equal thicknesses. In other examples, only the first ply 202 and the second ply 206 can have approximately equal thicknesses. In yet other examples, the first ply 202, the central layer 204, and the second ply 206 can each have different thicknesses. Each layer may have a thickness in a range of approximately 4 to 5 mils. In some embodiments, each layer can have a thickness of approximately 0.1 to about 20 mils.

FIG. 2B shows an exploded view of the flooring structure 100 that can comprise the top layer 104 of the moisture barrier membrane 102, which includes the first ply 202, the second ply 206, and the central layer 204, and flooring substrate 110.

Figure 2C:
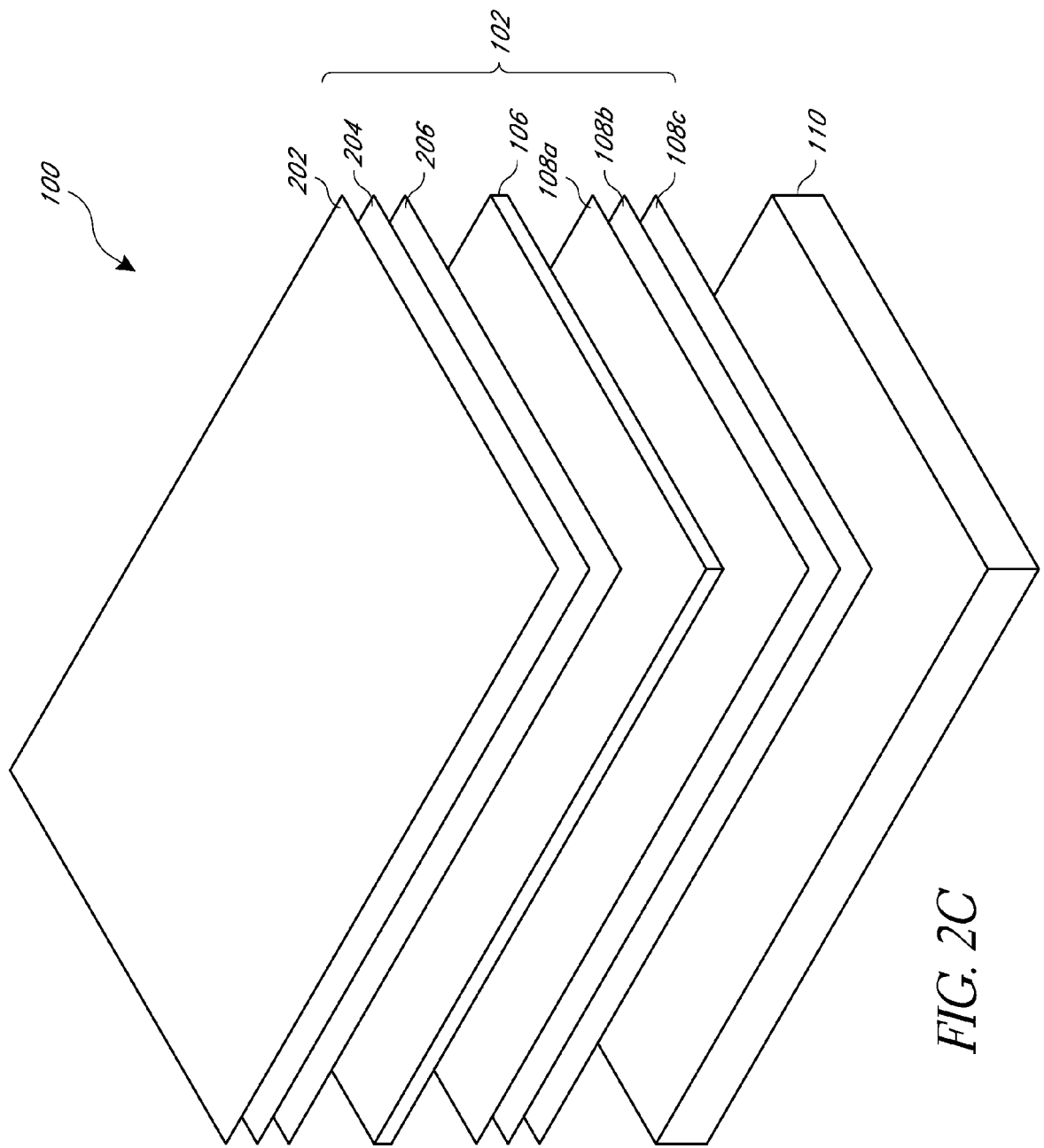
FIG. 2C is an exploded view of an embodiment of a flooring structure comprising a moisture barrier membrane.

As will be described in more detail below, FIG. 2C shows an exploded view of an example of the flooring structure 100. Flooring structure 100 can comprise a top layer, which includes first ply 202, central layer 204, and second ply 206, bottom layer 106, liner 108, which can include multiple liner layers 108a, 108b, and 108c, and flooring substrate 110. The number of layers or liners can be different in other embodiments of the membrane 102.

Figure 2D:
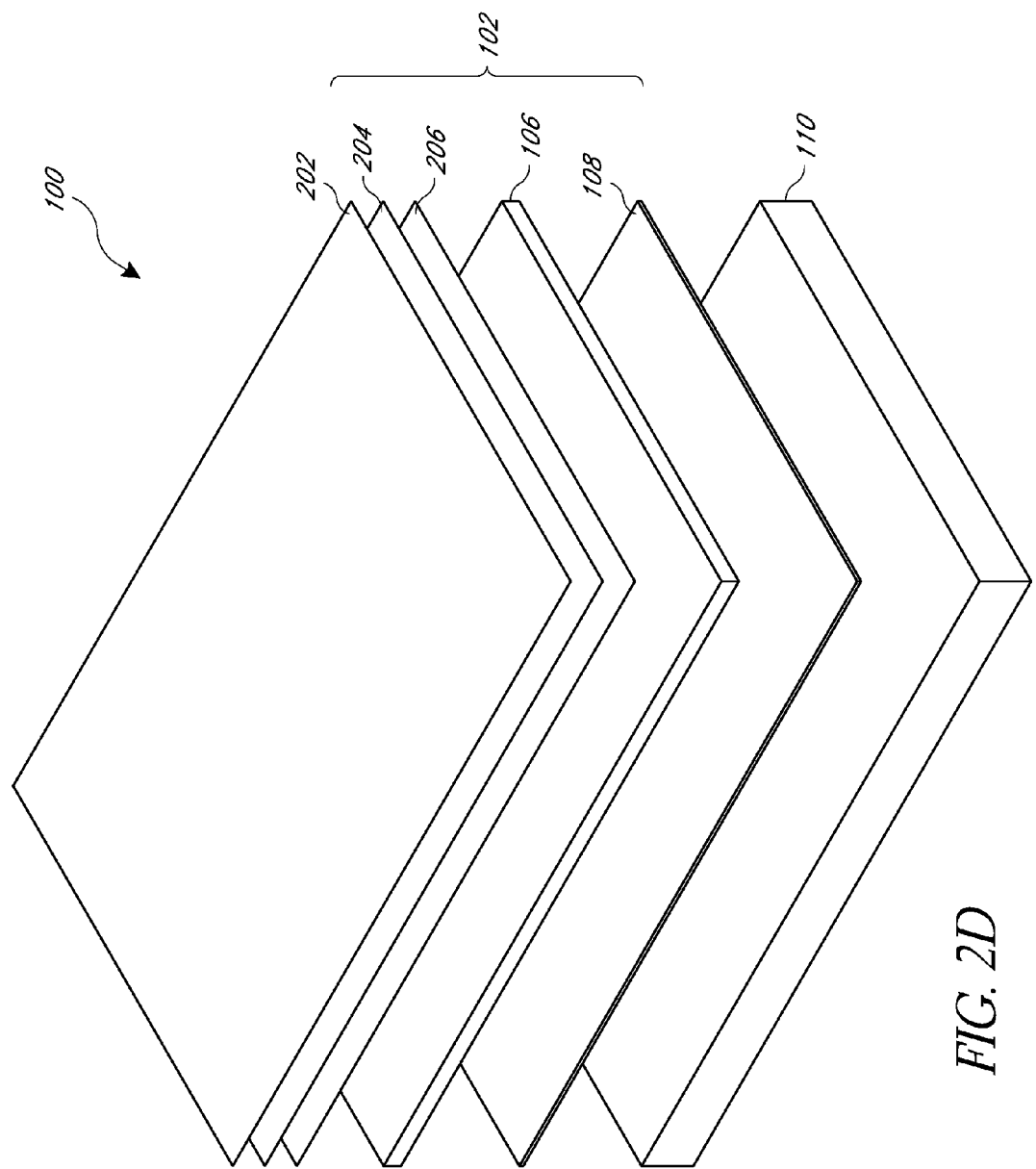
FIG. 2D is an exploded view of an embodiment of a flooring structure comprising a moisture barrier membrane.

FIG. 2D shows an exploded view of the flooring structure 100 that can comprise the top layer 104 of the moisture barrier membrane 102, which includes the first ply 202, the second ply 206, and the central layer 204, the liner 108, and the flooring substrate 110.

The top layer 104 can comprise several materials. Each of the plurality of plies can include non-woven fabric, such as any non-woven polyester and/or fiberglass. The non-woven fabric can be bonded together by entangling fiber or filaments mechanically, thermally, and/or chemically. Use of the non-woven fabric may be advantageous for several reasons. Non-woven fabric can provide greater strength, higher tear and tensile strength, greater stability, and higher levels of uniformity than traditional (e.g., woven) fabrics. The non-woven fabric can also assist the moisture barrier membrane 102 in lying flat if the moisture barrier membrane 102 is unrolled, as in some implementations.

In some examples of the top layer 104, it can be advantageous to use non-porous material. Though examples of the top layer 104 described herein may be substantially non-porous, the top layer 104 can act as a porous material when adhesive is applied. For example, the flooring structure 100 can include an adhesive substance to bond a floor covering to a top surface of the top layer 104. Since the top layer 104 can comprise the non-woven fabric, the top surface of the top layer 104 can absorb at least some of the adhesive. Even a small amount of absorption of adhesive by the top layer 104 can advantageously create a strong bond between the top layer 104 and the floor covering.

In some examples, the central layer 204 can be disposed in between the first ply 202 and the second ply 206. The central layer 204 can comprise polyethylene, polyurethane, ethylene vinyl acetate, polyvinylchloride, and/or polyethylene and ethylene vinyl acetate (PEVA), among other plastics or polymers. The composition of the central layer 204 can provide a barrier to sufficiently prevent plasticizer used in the floor covering from migrating to the bottom layer 106 (which may include petroleum based material).

Advantageously, the top layer 104 may form a homogeneous fabric layer by several mechanisms. In one example, the top layer 104 can be formed through several construction methods, including point bond construction. Point bond construction of the top layer 104 can include thermally bonding the first ply 202 with the second ply 206 using at least one patterned roller having a pattern and/or at least one smooth roller. As the plies pass between the rollers and are simultaneously heated, the pattern of the patterned roller can imprint on the combination of the first ply 202 and the second ply 206. The imprinted pattern can form and strengthen a bond between the first ply 202 and the second ply 206. The first ply 202 and the second ply 206 can further be pressed and thermally heated in some construction methods.

In another example, the top layer 104 can be spun-laced, spun-bound, laminated, and/or the like. Specifically, spun-lacing (e.g., hydroentanglement) can improve the integrity of fabric, including non-woven fabric, by using high-speed water jets to spin a web so that the fibers of the non-woven fabric knot about one another. These techniques of forming the homogeneous fabric layer can strengthen a bond between the top layer 104 and the bottom layer 106.

Once formed, the homogeneous fabric layer can greatly reduce the risk of delamination of a floor covering. Many types of floor coverings have a propensity to grow and/or move vertically and/or horizontally as they acclimate to the ambient conditions of the room. As a result, delamination can cause the floor covering to have raised edges and corners. Delamination can also occur if the flooring substrate 110, such as concrete, is not properly prepared or cured before the membrane 102 and floor covering 120 is installed. When the flooring substrate 110 is not properly prepared, delamination can cause each of the layers of flooring structure 100 to separate and/or fracture over time.

To help reduce the risk of delamination, a top surface of the homogeneous fabric layer can be configured to receive a flooring adhesive. The flooring adhesive can bond the floor covering to the homogeneous fabric layer. The reduced delamination risk (for example, through enhanced bonding) advantageously helps to increase the stability and/or durability of the floor covering.

The homogeneous fabric layer can also advantageously reduce plasticizer migration. For decades, plasticizer migration has been an issue in residential and commercial products. Some commercial markets have reduced the amount of plasticizer present in certain products, however, plasticizer migration remains relevant.

Plasticizers are additives and/or other chemicals added to materials, such as plastics, vinyl, and rubber, to increase the materials' flexibility, softness, fluidity, plasticity, durability, and/or the like. Similarly, certain properties of other materials, such as concrete, clay, and/or other materials can improve when blended with plasticizer. For example, plasticizer can strengthen and reinforce concrete by reducing the amount of water necessary to mix with concrete.

Nearly all resilient floors, such as polyvinyl chloride flooring, include plasticizer and/or a similar polymer because such flooring is flexible and easy to install. Over time, however, plasticizers can migrate to petroleum products such as oil and be absorbed by surrounding material. Migration of the plasticizer can degrade any material used in the flooring structure, including oil-based asphalt, polymers, bitumen, and/or the like, as well as the adhesives used in the flooring structure.

In some circumstances, heat and pressure can speed up the process of plasticizer migration. Therefore, it can be advantageous to reduce plasticizer migration in flooring installation where heat and pressure can build up between the floor covering and flooring substrate 110.

Figure 3A:
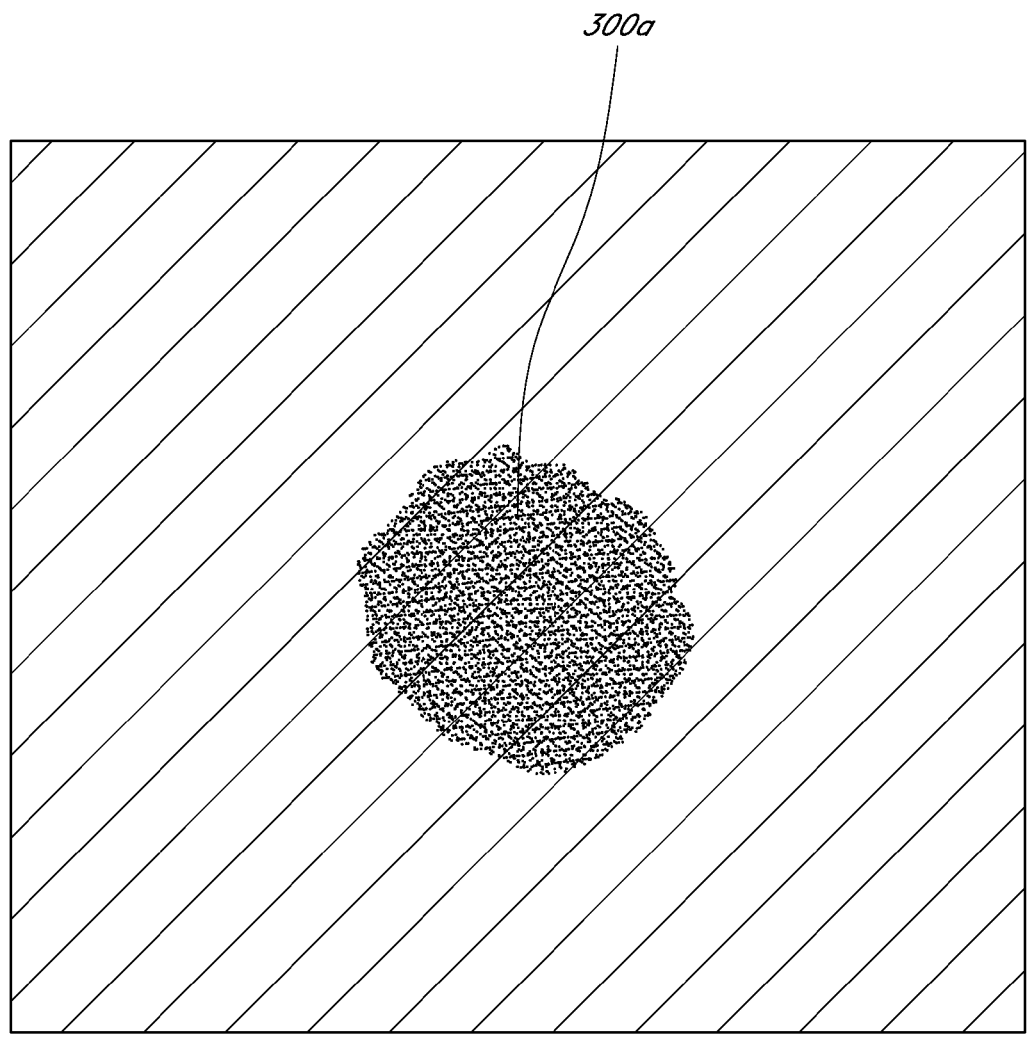
FIGS. 3A and 3B schematically represent an embodiment of a moisture barrier membrane.

Traditional top layers of a moisture barrier can allow plasticizer migration to occur. In an experiment, 15 drops of plasticizer were placed at a single point on a traditional top layer of fabric of a moisture barrier membrane. FIG. 3A shows the results twelve hours later. The plasticizer has fully migrated through the fabric, leaving a roughly circular spot 300a about 2.5 inches in diameter.

Figure 3B:
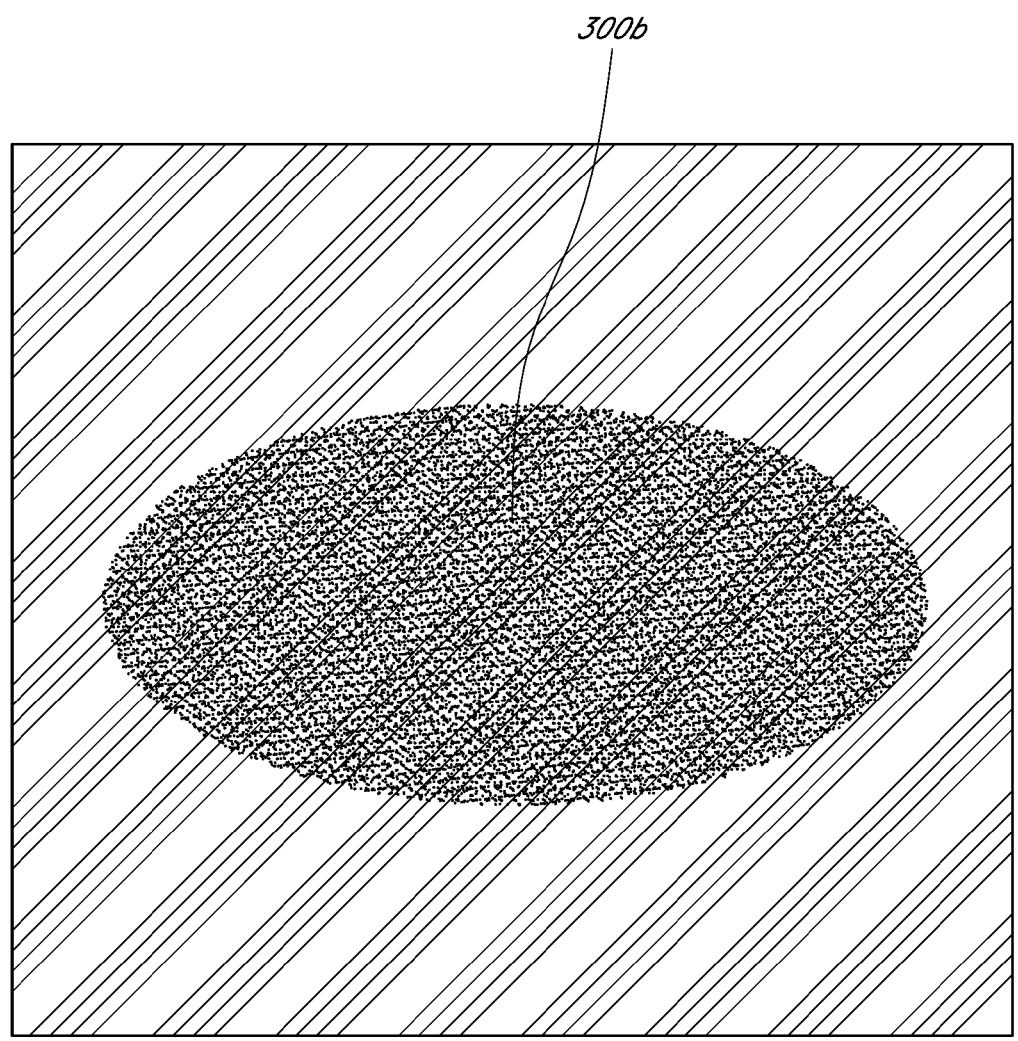
Figure 3C:
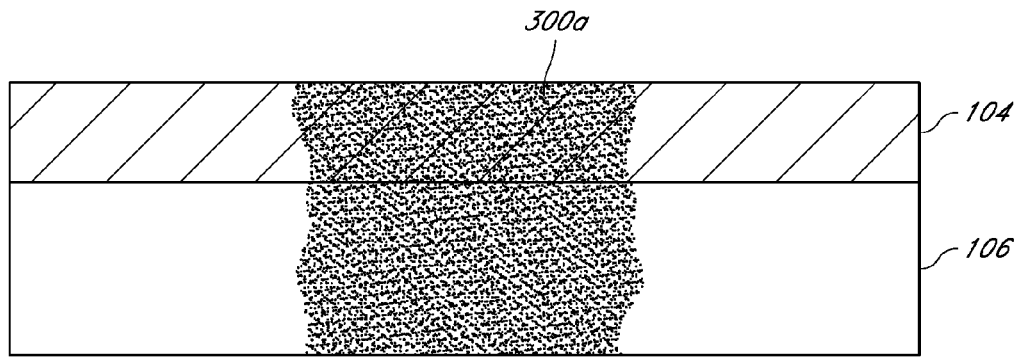
FIGS. 3C and 3D are cross-sections that schematically illustrate effects of plasticizer on an embodiment of a moisture barrier membrane.
Figure 3D:
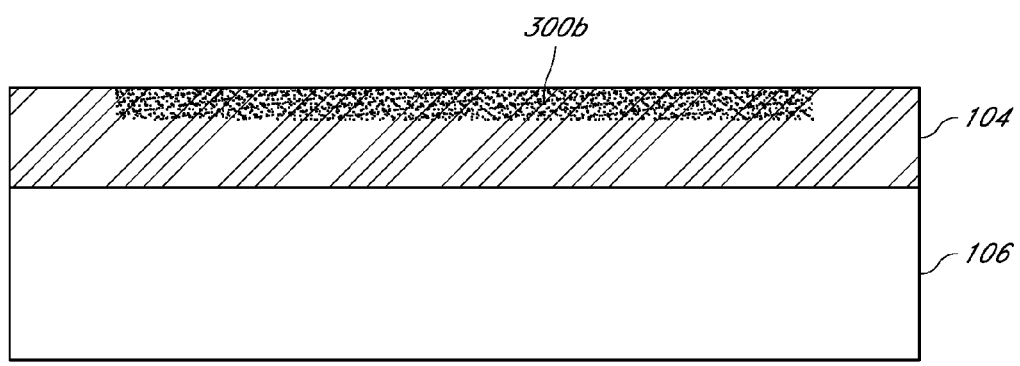

As illustrated in FIG. 3B, an embodiment of the homogeneous fabric top layer 104 disclosed herein can advantageously provide a barrier to sufficiently prevent plasticizer migration, thereby providing long-term integrity to the flooring structure. Such embodiments can block plasticizer in the floor covering from contact with oils in the bottom layer 106. The fabric layer in FIG. 3B has a spun-lace construction that makes the fabric plasticizer migration resistant. As with the experiment described with reference to FIG. 3A, 15 drops of plasticizer were placed at a single point on the spun-lace construction fiber top layer. FIG. 3B shows the results twelve hours later. In contrast to the results shown in FIG. 3A, no migration through the top layer was observed (in 12 hours). Instead, the plasticizer disbursed across the fabric surface (while not migrating through the fabric) leaving an oval spot 300b roughly 8.25 inches by 4.25 inches. FIGS. 3C and 3D are cross-sections that schematically illustrate effects of plasticizer on an embodiment of a moisture barrier membrane. FIG. 3C is a cross-section of the example shown in FIG. 3A and schematically illustrates migration of the plasticizer 300a through the top layer and into the bottom layer. FIG. 3D is a cross-section of the example shown in FIG. 3B and schematically illustrates that no migration of the plasticizer 300b occurred through the top layer and into the bottom layer. In some examples, migration of the plasticizer 300b can occur through only a portion of the top layer, for example, being disbursed across the surface of the top layer. The top layer in FIGS. 3B and 3D prevented plasticizer from migrating into the bottom layer and in contrast to FIGS. 3A and 3C, the plasticizer disbursed across the upper surface of the top layer without passing through the top layer.

Accordingly, this embodiment of the fabric top layer inhibited migration and provided disbursement across the top layer at a rate of 2.3 square inches per hour. The disbursement rate (across the fabric) is about 5.6 times greater than for the traditional fabric top layer. Thus, this embodiment of the homogeneous fabric layer allowed the plasticizer to disburse across the top layer rather than to migrate through the top layer (as in FIG. 3A). In another experiment, a piece of traditional top layer material and a piece of an embodiment of fabric top layer 104 disclosed herein were formed into cones and placed in funnels over beakers. Plasticizer (an oil in this experiment) with a red indictor was placed inside each of the cones, and the amount of the plasticizer (if any) that passed through the materials and collected in the beakers was measured. With the traditional top layer material, not insubstantial amounts of the red-colored plasticizer passed through the traditional material and collected in the beaker in about ten minutes. In contrast, with the embodiment of the top layer 104 described herein, no migration of the red-colored plasticizer through the top layer and into the beaker was observed. Accordingly, this embodiment of a non-porous top layer 104 prevented plasticizer migration.

The more even disbursement and non-migration of plasticizer can, for example, help to prevent degradation of adhesives used throughout the flooring structure (because the plasticizer is inhibited from migrating to the adhesives). Therefore, the floor covering, and flooring structure 100 can remain intact and may not require repair shortly after installation. In other examples, the top layer 104 of the moisture barrier membrane can be tested for its ability to prevent the migration of plasticizer according to the ASTM D-7888 standard. Accordingly, embodiments of the non-porous top layer 104 (e.g., homogeneous fabric or spun-lace construction; see also, e.g., FIGS. 2A-2D, with layers 202, 204, 206) may provide a disbursement of plasticizer that is in a range of greater than 3, greater than 5, greater than 10, or more times the disbursement in traditional fabric top layers. Some such embodiments may additionally inhibit or prevent migration of plasticizer through the top layer. Additionally, some such embodiments of the moisture barrier membrane 102 comprising the non-porous top layer 104 can be used in applications other than flooring such as, e.g., roofing applications or other building applications where a non-porous moisture barrier is advantageous. Accordingly, a building structure (e.g., a roofing structure) can comprise embodiments of the non-porous moisture barrier membrane 102.

Examples of the Bottom Layer

The moisture barrier membrane 102 can comprise a bottom layer 106. The bottom layer 106 can include several materials and various compositions. For example, the bottom layer 106 can include varying amounts elements, such as petroleum bitumen, rubber copolymer, natural rubber, synthetic rubber, hydrotreated heavy-naphthenic distillate, calcium carbonate, plant extract, and/or the like. In one example, the bottom layer 106 can comprise 60-80% petroleum bitumen, 15-20% rubber copolymer, 1-5% hydrotreated heavy naphthenic distillate, 1-5% calcium carbonate and 1-5% plant extract. Other embodiments of the bottom layer 106 can comprise 0-10%, 10-20%, 20-30%, 30-40%, 40-50%, 50-60%, 60-70%, 70-80%, 80-90%, and/or 90-100% petroleum bitumen, 0-10%, 10-20%, 20-30%, 30-40%, 40-50%, 50-60%, 60-70%, 70-80%, 80-90%, and/or 90-100% rubber copolymer, 5-10%, 10-15%, 15-20%, 20-25%, 25-30%, 30-35%, 35-40%, 40-45%, and/or 45-50% hydrotreated heavy naphthenic distillate, 5-10%, 10-15%, 15-20%, 20-25%, 25-30%, 30-35%, 35-40%, 40-45%, and/or 45-50% calcium carbonate and/or 5-10%, 10-15%, 15-20%, 20-25%, 25-30%, 30-35%, 35-40%, 40-45%, and/or 45-50% plant extract.

Some examples of the bottom layer can include only rubber copolymer and petroleum bitumen. Other examples can include any combination of the one or more elements.

The bottom layer 106 can have a thickness of about 40 to 45 mils. In some embodiments, the bottom layer 106 has a thickness in a range of approximately 5 to 100 mils, 10 to 75 mils, 20 to 60 mils, or some other range.

Example embodiments of the bottom layer 106 can effectively suppress water vapor emission. As a result, the bottom layer 106 can have a very low perm rate. In some embodiments, the bottom layer 106 can suppress water vapor emissions and/or water vapor transmissions up to 99% relative humidity. Relative humidity can measure the volume of moisture vapor in a material. The relative humidity in the flooring substrate 110 can increase depending on ambient humidity levels, rain, and/or other weather conditions.

Over time, the moisture vapor can emit from the flooring substrate and pass through the adhesive and floor covering. As a result, the bottom layer 106 can advantageously reduce the water vapor transmission rate throughout the flooring structure. Bottom layers having perm rates below about 0.1 perms may advantageously reduce water vapor transmission.

The composition of the bottom layer 106 can advantageously have adhesive properties. For example, the bottom layer 106 can stick to any flooring substrate 110, including concrete and/or wood, among other materials. When exposed (e.g., by peeling back a liner), the bottom layer 106 can be sticky or tacky. Since the bottom layer 106 can stick and/or attach to the flooring substrate 110, the bottom layer 106 allows the flooring structure 100 to be installed without the use of double-sided seam tape that is used in installations of other floor coverings. As described below, in floating installations, a liner may be left on the membrane 102 so that it is not adhered to the flooring substrate 110 after installation.

There can be several advantages to installing the moisture barrier membrane, e.g., the installer can save time, money, and/or materials during installation of a flooring structure. Even in implementations of the moisture barrier membrane where the bottom layer 106 is not attached or adhered to the flooring substrate 110 (e.g., a floating installation), the bottom layer 106 can significantly reduce moisture vapor transmission through the moisture barrier membrane and increase the stability, integrity, and/or durability of the flooring structure. The bottom layer 106 can also form a strong adhesive bond with the flooring substrate 110.

Examples of the Liner

The flooring structure 100 can include the liner 108. In some examples, liner 108 can be removable from the moisture barrier membrane 102, e.g., by peeling the liner away from the bottom layer. The liner 108 can be attached to the bottom layer 106 of the moisture barrier membrane 102. In alternative examples, the liner 108 can be permanently attached to the bottom surface of the bottom layer 106 of the moisture barrier membrane 102.

There are several advantages to using the liner 108. The liner 108 can advantageously provide protection to the bottom layer 106 while the liner 108 is attached to the moisture barrier membrane 102, e.g., during storage or transportation. The liner 108 can also help the bottom layer 106 retain its adhesive properties prior to installation over the flooring substrate.

The liner 108 may also advantageously facilitate the ease of handling of the moisture barrier membrane 102 until the moisture barrier membrane 102 is installed over the flooring substrate 110 in the proper position. In this example, the liner 108 can prevent the bottom layer 106 from attaching to other portions of the moisture barrier membrane 102 or prevent the bottom layer 106 from bonding to an incorrect material or in an incorrect position or alignment.

The liner 108 can comprise one or more materials. For example, the liner 108 can include nylon, polyethylene and/or the like. In some embodiments, the liner 108 can be rigid. In other embodiments, the composition of the liner 108 can advantageously allow the liner 108 to be flexible. The flexibility of the liner 108 can allow the liner 108 to stretch and reduce the probability that the liner 108 will tear. The flexibility of the liner 108 can be particularly important while the moisture barrier membrane 102 is in a rolled-configuration. The flexibility of the liner 108 can also be advantageous while the installer rolls, unrolls, places, and/or cuts the moisture barrier membrane 102.

Some examples of the liner 108 can have a thickness of about 1 mil. In some examples, the liner 108 can have a thickness in a range of about 0.5 to 20 mil. As shown in FIG. 2C, some embodiments of the liner can include multiple layers of liner 108. The multiple layers of liner 108 can increase the strength and durability of the liner 108.

Figure 4A:
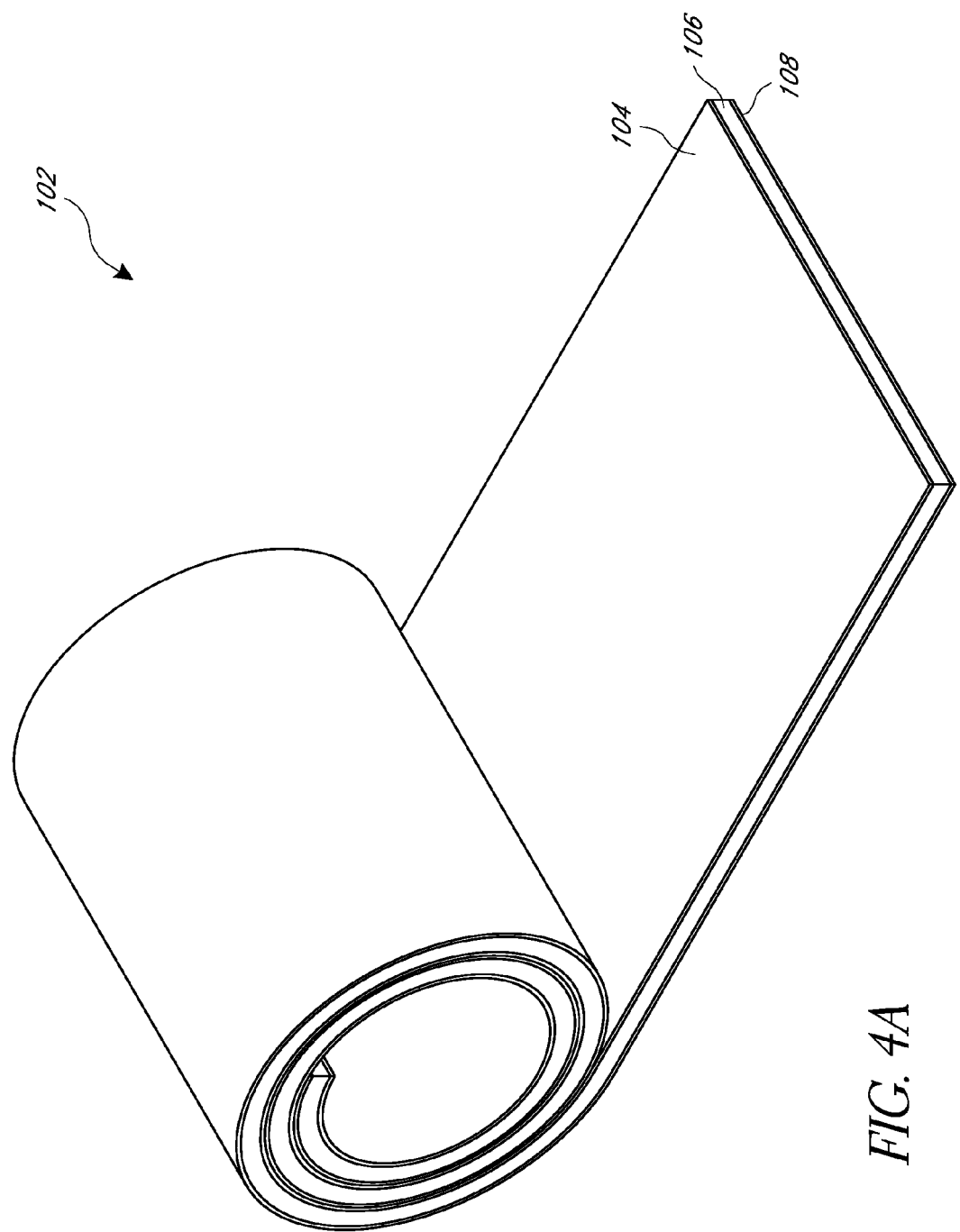
FIG. 4A schematically illustrates an embodiment of a rolled moisture barrier membrane.

FIG. 4A illustrates an example of a moisture barrier membrane 102 in a rolled configuration. The right-most edge of the membrane 102 is shown as having been unrolled from the rest of the roll on the left. In this example, the moisture barrier membrane 102 includes the top layer 104, the bottom layer 106, and the liner 108.

Figure 4B:
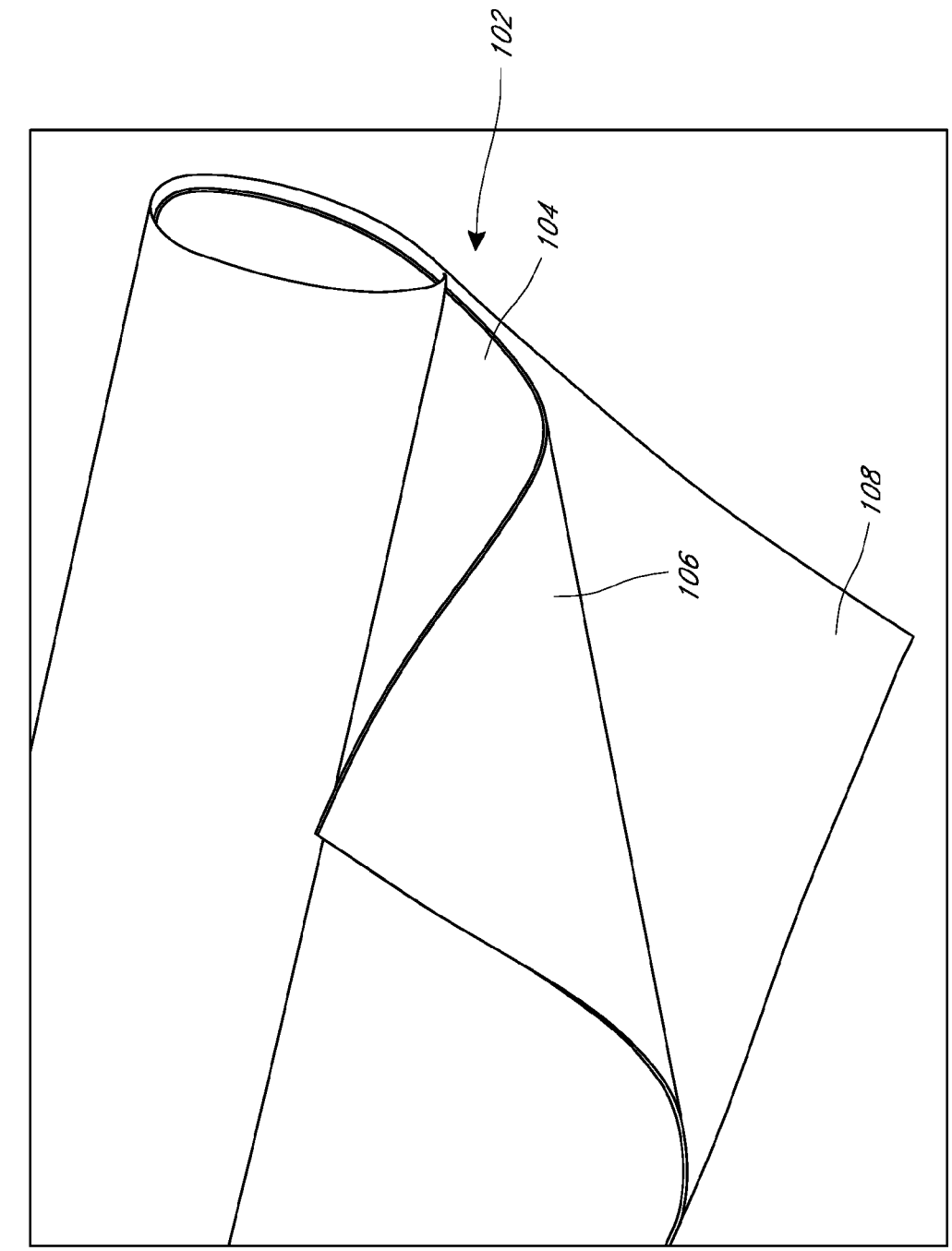
FIG. 4B schematically illustrates an embodiment of a rolled moisture barrier membrane with a corner of the membrane peeled away from a liner.

In an example illustrated in FIG. 4B, the liner 108 can have a larger length and/or width than the top layer 104 and/or the bottom layer 106. The liner 108 may have a smaller thickness that the top layer and/or the bottom layer. Either of these features may make it easier to peel the liner away from the bottom layer (or vice-versa). The larger length and width of the liner 108, as well as the smaller thickness, can be advantageous as the larger length, the larger width, and the smaller thickness of the liner 108 can allow the liner 108 to remain extensible. In some examples, it can advantageous for the liner 108 to remain extensible because the outside of the rolled moisture barrier membrane 102 can be longer than the inside. As a result, the liner 108 may need to stretch as the moisture barrier membrane 102 is rolled and/or unrolled.

Examples of Seam Tape

Figure 5A:
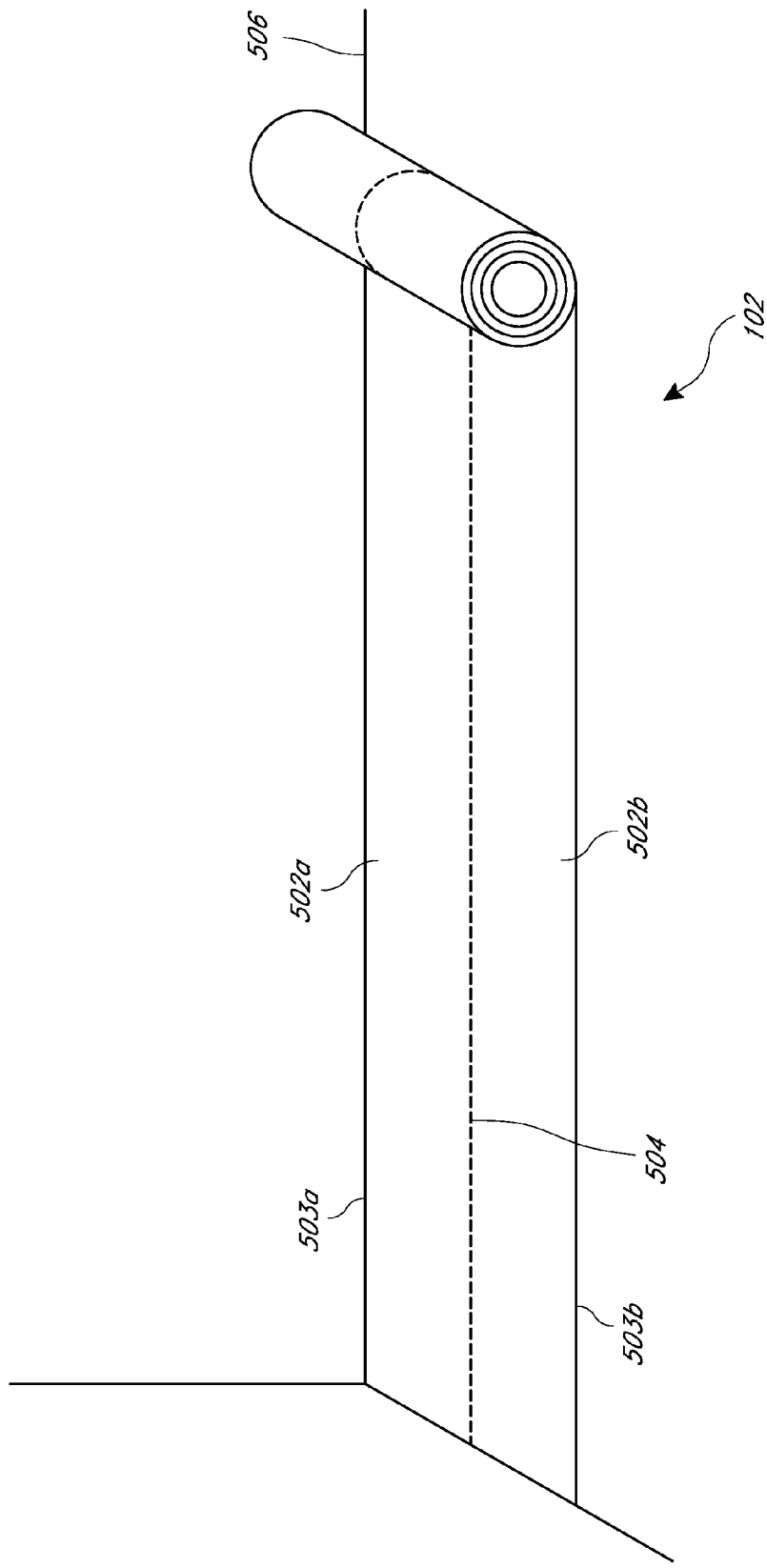
FIGS. 5A-5D schematically illustrate examples of stages of an installation of an embodiment of a moisture barrier membrane.
Figure 5B:
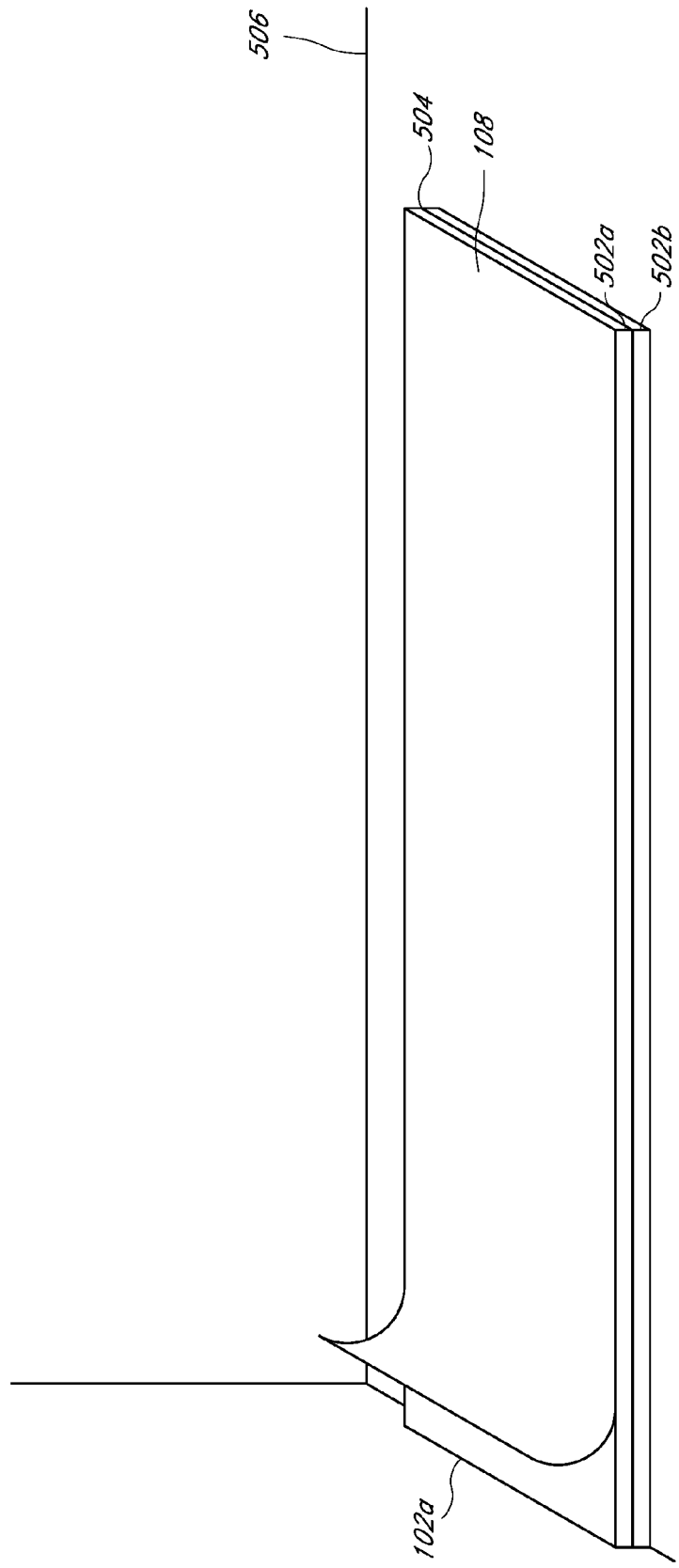
Figure 5C:
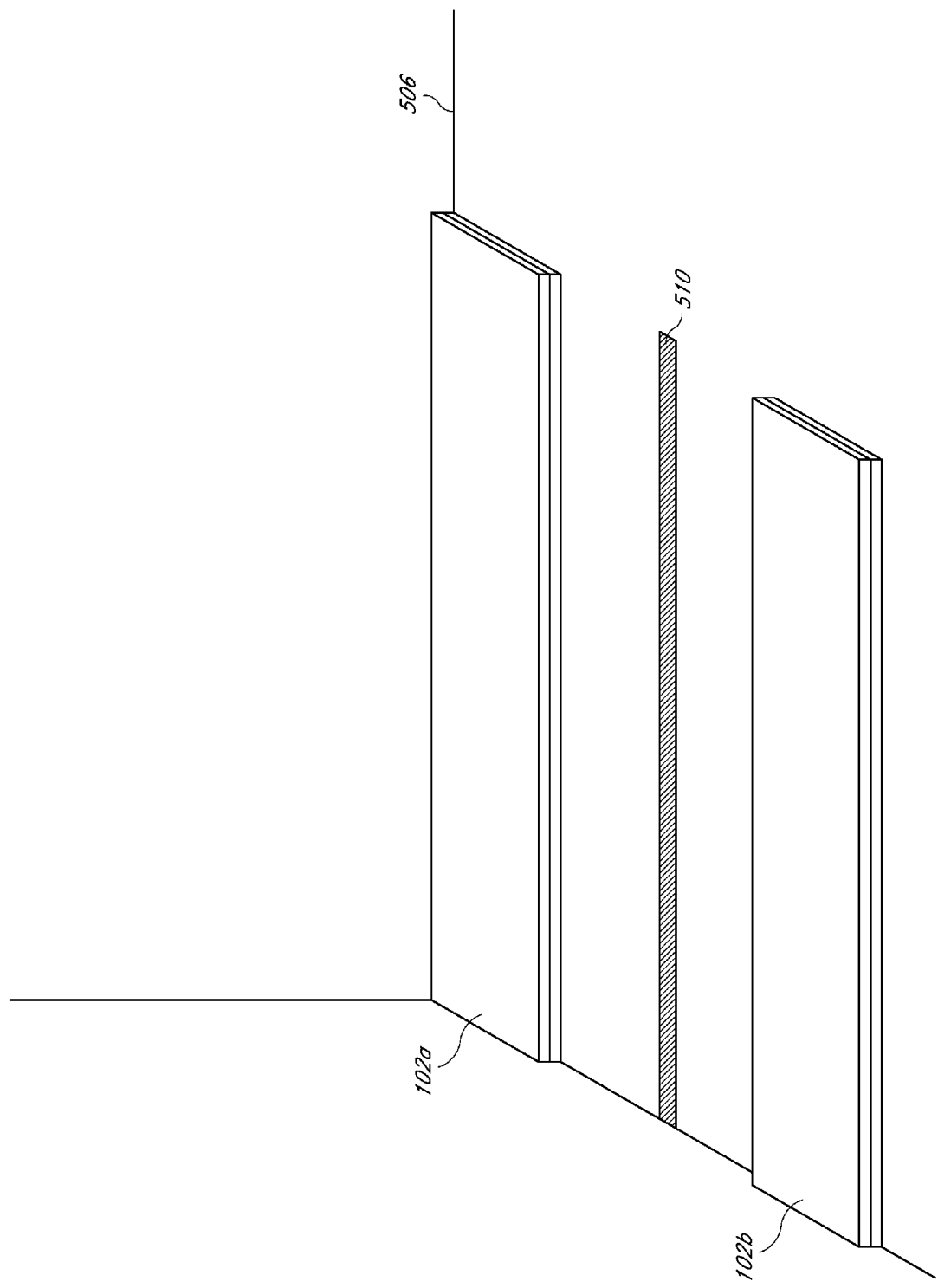

With reference to FIG. 5C and as further described below, during certain methods of installing a moisture barrier over a flooring substrate, a seam tape 510 can be used. There are several advantages of using seam tape 510 during installation of the flooring structure 100. For example, the seam tape 510 can be applied to a seam line 508 formed between two or more adjacent and/or abutting pieces of the moisture barrier membrane 102. The seam tape 510 can effectively form an air-tight seal along the seam line 508. Advantageously, the seam tape 510 can include waterproofing material and can prevent additional moisture from entering the flooring structure 100. The seam tape 510 can also help prevent leaks of air and prevent other substances from entering the flooring structure 100.

Telegraphing may occur when an indentation, marking, or protrusion in a flooring substrate shows through in the floor covering (particularly resilient floor coverings). The use of seam tape that is too thick may lead to telegraphing the shape of the seam tape in the floor covering, which is unsightly. Additionally, either side of the seam tape may include a logo, arrow, instructional comments, and/or other markings. It could be displeasing to the customer if any marking on the seam tape telegraphs through the floor covering and becomes visible to users. Similarly, it could be disadvantageous if an indentation or thickness of a tape imprinted through the flooring, causing uneven or slightly raised areas of the floor covering. Accordingly, it can be advantageous to use seam tape that has zero-telegraphing or low-telegraphing properties. Smaller thicknesses of the seam tape can enhance zero-telegraphing or low-telegraphing properties. Accordingly, the seam tape 510 can be very thin. For example, the seam tape 510 can comprise a thickness of about 2 mils. In other embodiments, the seam tape 510 can comprise a thickness in a range from about 0.5 to 5 mils. The seam tape can have a width in a range of 1 to 4 or more inches.

The seam tape 510 can include several materials, such as unplasticized polyvinyl chloride (UPVC) film, among other materials. These materials advantageously can have a low perm rate and can help to prevent water vapor from passing into the gap between adjacent and/or abutting pieces of the moisture barrier membrane 102. The seam tape 510 can also comprise natural rubber adhesive, among other adhesive materials. In some embodiments, seam tape 510 provided by Traxx Corporation (Pomona, Calif.) can be used.

Examples of the Floor Covering

The flooring structure can include one or more types of floor covering. For each flooring structure, a user can select numerous types of floor covering to install on top of the moisture barrier membrane 102. For example, examples of the floor covering can include carpet tile, vinyl composition tile (VCT), luxury vinyl tile (LVT), solid vinyl tile (SVT), luxury vinyl plank (LVP), high-end sheet vinyl, ceramic tile, laminates, solid wood, engineered wood, and so forth. In some examples, the floor covering can include tiles, sheets, and strips, among other configurations. The floor covering can include intermediate layers such as screed, cushioning or underlayment that are installed over the membrane and under the finished flooring (e.g., the carpet or tile).

Example Methods of Installation

Embodiments of the moisture barrier membrane 102 described herein can be installed over a flooring substrate 110 by one or more people in one or more ways. Traditional methods, such as two-part epoxy systems, which require the combination of multiple substances, such as a resin and a hardener, have several disadvantages. For example, traditional methods of installing a flooring structure can be very expensive. Additionally, traditional methods of installing a floor covering may take a very long amount of time to complete. In the two-part epoxy system, for example, the drying and/or curing time could be very long, and the flooring structure can require multiple intermediate coatings for the epoxy to work properly.

Advantageously, the moisture barrier membrane 102 disclosed herein may be installed in a flooring structure 100 by a peel and stick method and/or a loose-lay method, among other methods. In particular, the peel and stick method can be very cost effective and can cost approximately 50% less than traditional methods. Additionally, the installation methods described below generally require less time for installation and may not involve multiple coatings for adhesive. Instead, the methods of installing a flooring structure 100 can allow the moisture barrier membrane 102 to adhere to the flooring substrate 110 as soon as an installer removes the liner 108 and the bottom layer 106 is pressed onto the flooring substrate 110.

Furthermore, traditional methods of installation can cause flooring structures to have low moisture suppression properties. The methods of installation described below can install the moisture barrier membrane 102 and have superior moisture suppression properties. Some installations the flooring structure can also increase moisture suppression properties of the flooring structure as a whole. Accordingly, the methods of installing the flooring structure described herein can be less expensive, require less time to complete, and/or have superior moisture suppression properties compared to traditional methods.

Example Methods for Preparing a Foundation Layer

Before installing any moisture barrier membrane, it can be advantageous to carefully and sufficiently prepare a flooring substrate and/or underlayment. If a flooring substrate is not properly prepared, the moisture barrier membrane may not be adequately secured. As a result, fracturing, delamination, and/or the like may not be effectively prevented.

In one example of a method of preparing a flooring structure, the installer can prepare the flooring substrate. During preparation, it can be advantageous to determine one or more moisture conditions (e.g., relative humidity) of the flooring substrate of the floor, for example, to determine whether the moisture conditions are unsuitable for further installation of the membrane. To determine various moisture conditions, such as relative humidity, a builder can test a relative humidity of the flooring substrate 110. Various probes, such as an RH probe, and/or kits, such as the Wagner Rapid RH kit, can be used to test for moisture conditions. Embodiments of the moisture barrier membrane 102 can be installed if the relative humidity of the flooring substrate 110 is less than approximately 99%. RH testing can be performed in accordance with the ASTM F2170 standard.

In some methods of installing a flooring structure, a measurement of moisture conditions, such as relative humidity, can be taken at multiple locations of the flooring substrate 110. Measuring the moisture conditions at various locations of the foundation layer can be advantageous because the moisture conditions can be more accurately determined.

Before installation, the flooring substrate 110 of the flooring structure 100 can be prepared. In many circumstances, the flooring substrate 110 is not initially flat and/or smooth. In preparing the flooring substrate 110 for installation of the flooring structure 100, it can be advantageous to level and/or smooth the flooring substrate 110 because it can prevent most imperfections in the substrate from telegraphing through to the floor covering. A smooth and level surface can be formed by patching all cracks in the flooring substrate 110.

It may be advantageous to remove contaminants, such as residual adhesive, curing compounds, solvents, oils, and/or the like from the flooring substrate 110. Contaminants left on the flooring substrate 110 can reduce the effectiveness of a primer (if applied) and decrease the ability of the primer to adhere to the flooring substrate 110. Further, contaminants, such as solvents and oils can decrease the effectiveness of the moisture barrier membrane and increase the effects of plasticizer migration as previously discussed. Thus, some implementations include scraping or cleaning the top surface of the flooring substrate to remove the contaminants.

Depending on the patching material used to patch the flooring substrate 110, it may be necessary to cure and/or surface-dry the patching material. Over time, if the flooring substrate 110 is not cured for an appropriate amount of time, cracks in the flooring substrate 110 can cause cracks to form throughout the flooring structure 100 and in the floor covering 112. The amount of time for curing the patching material may vary depending on the extent of patching material applied to the flooring substrate 110 and the type of patching material used.

In some implementations, the installer can optionally prime the flooring substrate 110 by applying a primer. Several types of the primer may be used to prime the flooring substrate 110, for example, a water-based latex primer, a concrete primer, and/or a wood primer (for wood floor substrates), among others can be used.

Applying the primer to the flooring substrate 110 can have several advantages. The primer can encapsulate any construction dust laying on the flooring substrate 110. This may be advantageous because it maintains the integrity of the flooring structure 100 by reducing the effects of unwanted materials in the membrane. The primer can also provide a flat surface for receiving adhesive, the liner 108, and/or the bottom surface of the moisture barrier membrane 102. Thus, the primer can allow the moisture barrier membrane 102 to properly and securely bond with the flooring substrate 110. An example of the primer includes TraxxShield99 Primer (available from Traxx Corporation, Pomona, Calif.). After the primer has been applied, the primer can be cured for an appropriate period of time (e.g., 3 hours).

Examples of the Peel & Stick Method for Applying the Moisture Barrier Membrane

In some example methods of installing moisture barrier membrane 102, it can be advantageous to acclimate moisture barrier membrane 102 at a room temperature for an extended period of time (e.g., at least several hours or a day). Allowing the moisture barrier membrane 102 to acclimate to room temperature before installation can reduce the risk of tearing during installation and can enhance the water vapor suppression properties of the moisture barrier membrane 102.

Figure 5D:
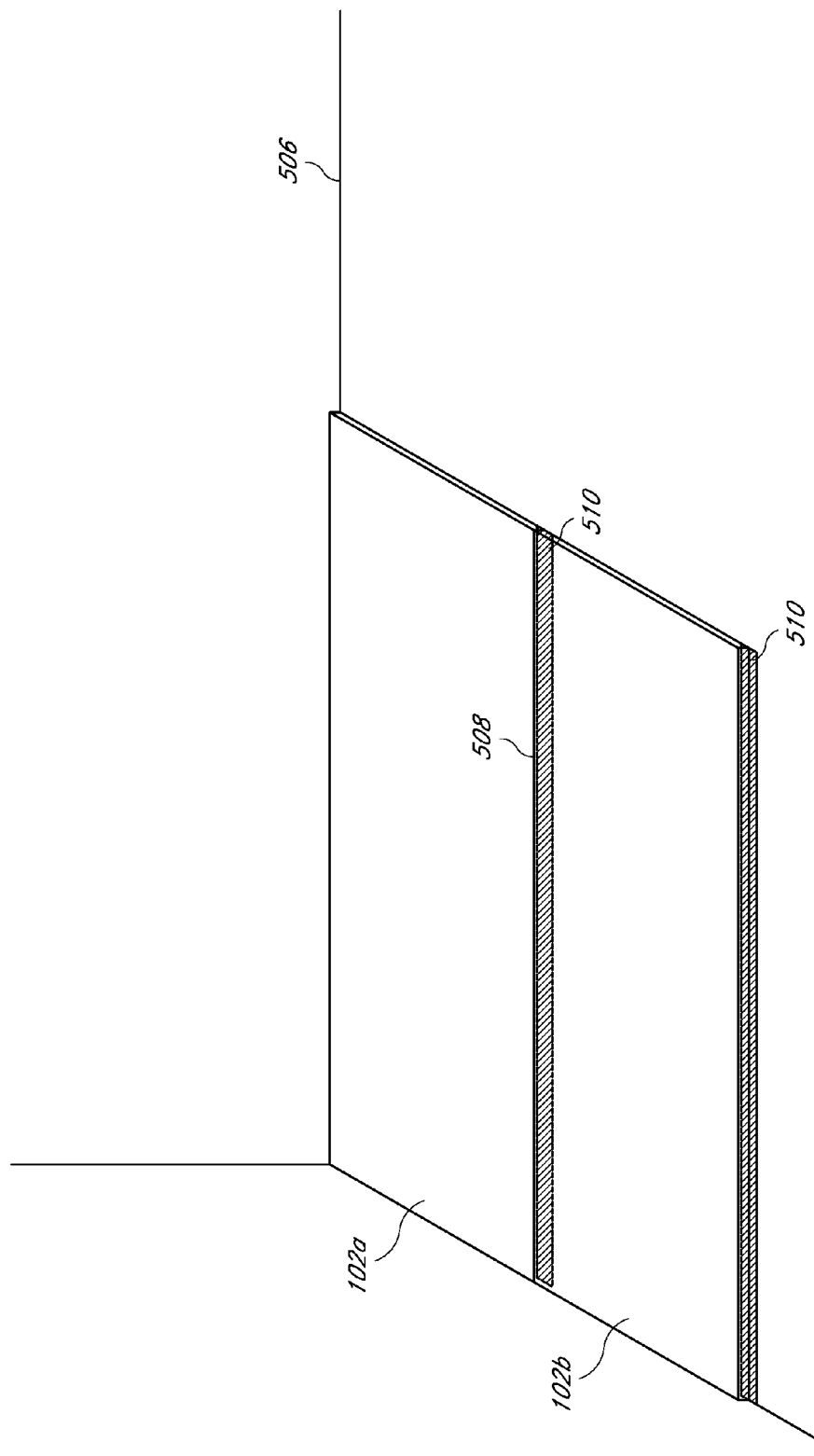
Figure 5E:
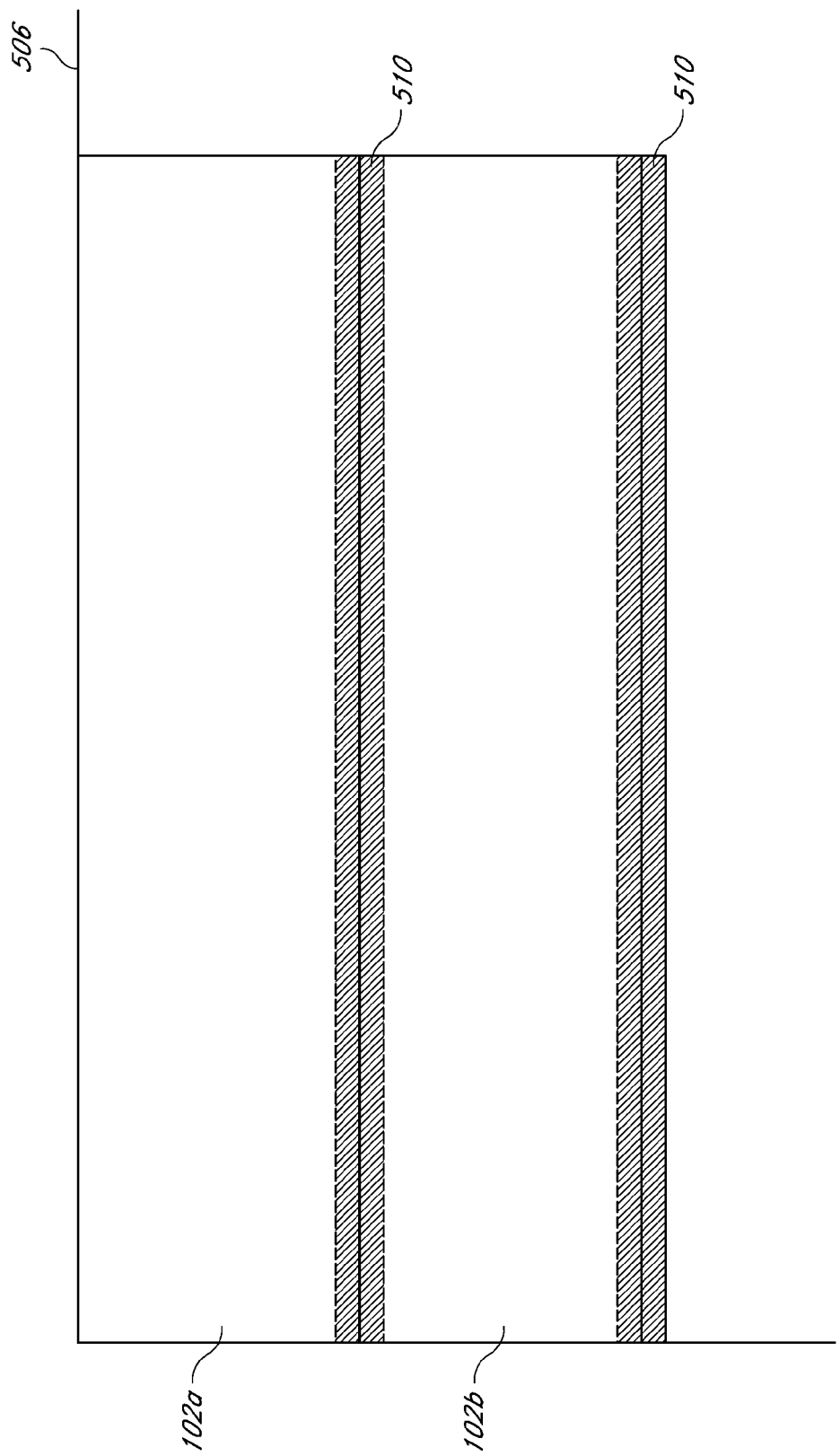
FIG. 5E is a top view of an example installation stage of an embodiment of a moisture barrier membrane.

FIGS. 5A-5D schematically illustrate examples of stages of an installation of an embodiment of a moisture barrier membrane. FIG. 5E is a top view of an example installation stage of an embodiment of a moisture barrier membrane. In this example, the moisture barrier membrane is provided in a roll that is unrolled during installation.

As shown in FIG. 5A, an installer can unroll the moisture barrier membrane 102 along a first wall 506, among other locations on the flooring substrate 110. The installer can cut the moisture barrier membrane 102 into the required shape and/or size to fit in place on the flooring substrate 110. The installer can then place the moisture barrier membrane 102 in the proper position. The materials of moisture barrier membrane 102 can advantageously allow the moisture barrier membrane 102 to be cut easily and quickly. In other implementations of installing a flooring structure 100, an installer can place the one or more flat pieces and/or the one or more flat strips along the first wall 506 of a room.

The moisture barrier membrane 102 can comprise a first side 502a and a second side 502b. A first edge 503a of the moisture barrier membrane 102 can correspond to the first side 502a and a second edge 503b of the moisture barrier membrane 102 can correspond to the second side 502b. The installer can place or align the first edge 503a of the first side 502a of the moisture barrier membrane 102 along or adjacent the wall 506. In some examples, the moisture barrier membrane 102 can be spaced a small distance from the bottom edge of the first wall 506, for example, less than about ⅛ inch from the wall.

Some implementations of the moisture barrier membrane 102 are capable of folding along an axis running through the midpoint of each piece of moisture barrier membrane 102. The moisture barrier membrane 102 can include a crease, perforated edge, fold line, or fringe 504 to more easily allow for each piece of the moisture barrier membrane 102 to fold in half.

As illustrated in FIG. 5B, a first piece 102a of the moisture barrier has been laid on the floor substrate 110, with the liner side down. Once the first piece 102a of the moisture barrier membrane 102 is properly aligned along the wall 506, the installer can fold the first side 502a of the first piece 102a of moisture barrier membrane 102 onto the second side 502b of the moisture barrier membrane 102 to expose the liner 108 (shown hatched in FIG. 5B). As discussed in more detail above, the various materials of the moisture barrier membrane 102, such as the top layer 104, which can comprise fiberglass and/or polyester, allow the moisture barrier membrane 102 to remain flexible. Because the moisture barrier membrane 102 can have increased flexibility, there can be a lower chance that the moisture barrier membrane 102 will tear and/or rip when it is folded.

As illustrated in FIG. 5B, the liner 108 can be removed and/or peeled off of the moisture barrier membrane 102 such that a bottom surface of the bottom layer 106 is exposed. The liner 108 can be removed from the first side 502a of the moisture barrier membrane 102 when the first side 502a is folded onto the second side 502b. Later in the installation, the liner 108 can be removed from the second side 502b of the moisture barrier membrane 102 when the second side 502b is folded onto the first side 502a. In other implementations described below, the liner 108 may not be removed during installation of the flooring structure, e.g., to provide a floating installation.

As illustrated in FIG. 5C, after the liner 108 is removed, the installer can fold the first side 502a of the moisture barrier membrane 102 back onto the flooring substrate 110. The exposed bottom layer 106 can act as an adhesive to initially bond the moisture barrier membrane 102 to the flooring substrate 110 The installer may hand press the moisture barrier membrane 102 onto the flooring substrate 110. To facilitate pressing the first side 502a of the moisture barrier membrane 102 onto the flooring substrate 110 and strengthening the adhesive bond, the installer may use a roller (e.g., a 100 pound roller) to roll over the membrane to firmly secure the bottom layer to the substrate. Use of a heavy roller at this stage of installation may advantageously flatten any high or low portions of the moisture barrier membrane 102.

Multiple pieces of the moisture barrier membrane 102 can be laid side-by-side to cover a room. The number of pieces of moisture barrier membrane 102 used during installation of the flooring structure can depend on the size and dimensions of the room, as well as the size and shape of the moisture barrier membrane 102. A larger flooring structure and/or room can require a larger number of pieces of moisture barrier membrane 102.

As illustrated in FIG. 5C, after at least one of the first side 502a and/or the second side 502b of the moisture barrier membrane 102 is sufficiently secured to the flooring substrate 110, an installer may place or align a second piece 102b of the moisture barrier membrane 102 adjacent to the second piece 102b of moisture barrier membrane 102. In some implementations, the installer can align the second piece 102b of moisture barrier membrane 102 such that it overlaps partially with the second edge 503b of the second side 502b of the first piece of the moisture barrier membrane 102a. The overlap can be about one inch or more. The second piece 102b can be configured such that it lays on top of the first piece 102a. Alternatively, the first piece 102a can be configured such that it lays on top of the second piece 102b.

The installer can cut along the overlapped portions of the two moisture barrier membranes 102a, 102b (a double cut) to create a seam line 508 between them. Double cutting the overlapped portions can advantageously create a tight seal between adjacent pieces of the moisture barrier membrane 102a, 102b as illustrated in FIG. 5D.

It can be advantageous to mark the seam line 508 during installation of the membrane. The installer can optionally physically mark the seam line 508 on the flooring substrate 110 by drawing a marker (e.g., a pencil) along an edge of one of the pieces of the membrane to provide a guideline for where seam tape (if used) should be positioned.

After forming a seam line 508 between adjacent pieces of the moisture barrier membrane 102 (and optionally drawing the guideline), the second piece 102b of the membrane can be temporarily removed or folded back, as illustrated in FIG. 5C. This allows the installer to properly position (e.g., along the guideline) and attach seam tape 510 (if used) to a top surface of the flooring substrate 110.

As previously described, the seam tape 510 can advantageously provide enhanced waterproofing, seal cracks in the flooring substrate 110, and/or seal gaps between adjacent or abutting pieces of moisture barrier membrane 102. In some implementations, as described in more detail below, the seam tape 510 can advantageously be double-sided (e.g., with adhesives on both sides of the tape) such that it is configured to attach to both the flooring substrate 110 and a bottom surface of the moisture barrier membrane 102 and/or a top surface of the moisture barrier membrane 102. In other installation techniques, the seam tape is single-sided (e.g., with adhesive on only one side of the tape), and the adhesive side is used to attach the seam tape to the flooring substrate 110.

Once the seam tape 510 is properly positioned, the installer can remove the remaining liner 108 from the first piece 102a and fold it back onto the substrate 110 over the seam tape. The installer can press down the second side 502b of the first piece 102a onto the flooring substrate 110 and/or directly onto the entire area of the seam tape 510 or a portion of the seam tape 510. The second side 502b can be pressed in a similar manner as the first piece 102a described above. For example, the installer can press with sufficient pressure the remaining portion of the first piece 102a that has not been previously pressed down or use a roller.

The installer can then apply a second piece 102b of the moisture barrier membrane 102 by aligning a first end of the second piece 102b with the second end of the first piece 102a. FIG. 5D illustrates an implementation where two adjacent pieces of the moisture barrier membrane have been pressed onto the seam tape 510. The installer can press down (e.g., using a hand roller) along the seam line 508 to establish a tight fit between the pieces 102a, 102b along the seamline. Advantageously, a zero-telegraphing seam line 508 can be provided by using a hand roller to secure the pieces 102a, 102b along the seam line 508.

FIG. 5E illustrates a top view of two adjacent pieces of moisture barrier membrane 102 that have been pressed onto the seam tape 510. In this example, the second side 502b of the second piece 102b of the moisture barrier membrane may not be fully secured to the seam tape 510 and/or flooring substrate 110. Instead, the second side 502b of the second piece 102b of the moisture barrier membrane may lay on top of a portion of the seam tape 510. The exposed portion of the seam tape 510 can be configured to receive a third piece of the moisture barrier membrane.

Generally, installation of the moisture barrier in a room requires installation of multiple sections of the moisture barrier membrane 102. The methods described herein can be repeated for successive rows of the moisture barrier membrane.

Once the moisture barrier membrane 102 is installed in the room, a floor covering can be installed over the moisture barrier membrane. For example, an adhesive can be applied to the membrane and spread out using a V-notch trowel, and then the flooring covering applied onto the adhesive to provide a finished flooring structure.

Examples of the Loose-Lay Method for Applying the Moisture Barrier Membrane 102

In some example implementations of installing the moisture barrier membrane 102, a loose-lay method may be used. Implementations of the loose-lay method for installing the moisture barrier membrane 102 can include substantially similar methods of aligning, placing, pressing, and/or curing one or more pieces of the moisture barrier membrane 102 previously described. However, in the loose-lay method, the liner 108 of the moisture barrier membrane 102 is not removed and/or peeled back from the bottom layer of the membrane 102. As a result, the moisture barrier membrane 102 can float over the flooring substrate 110 without adhering to the flooring substrate 110.

Figure 6A:
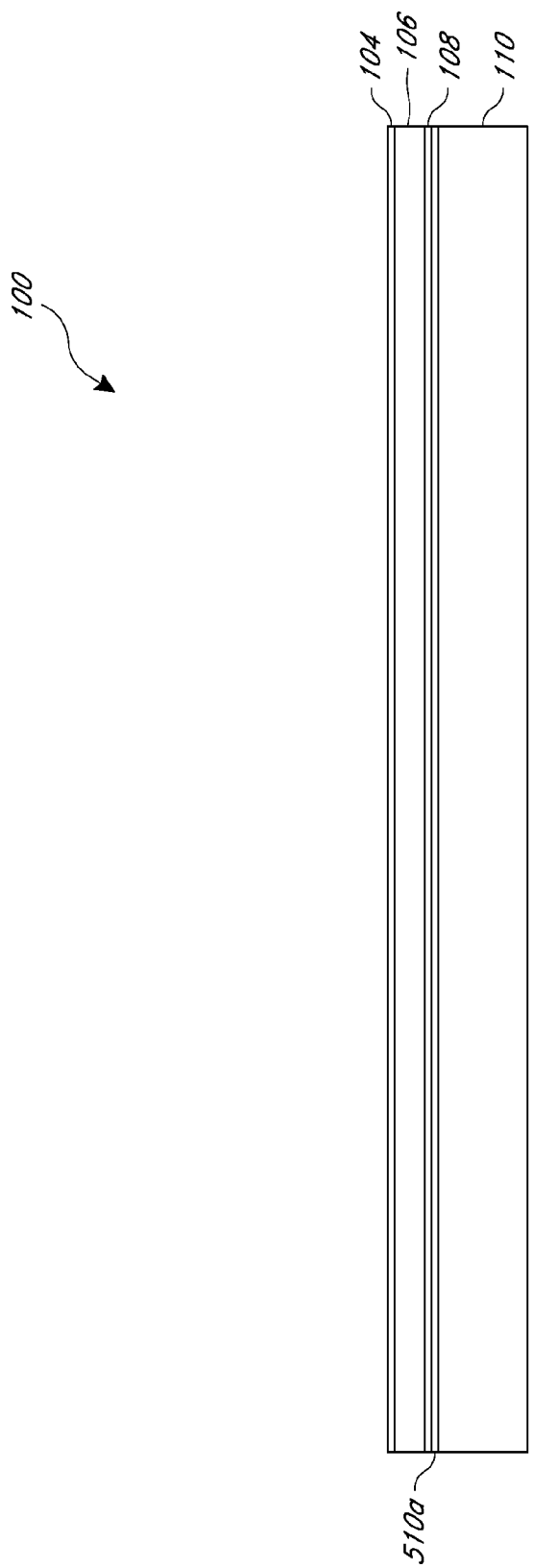
FIG. 6A is a side view of an embodiment of a flooring structure comprising a moisture barrier membrane.
Figure 6B:
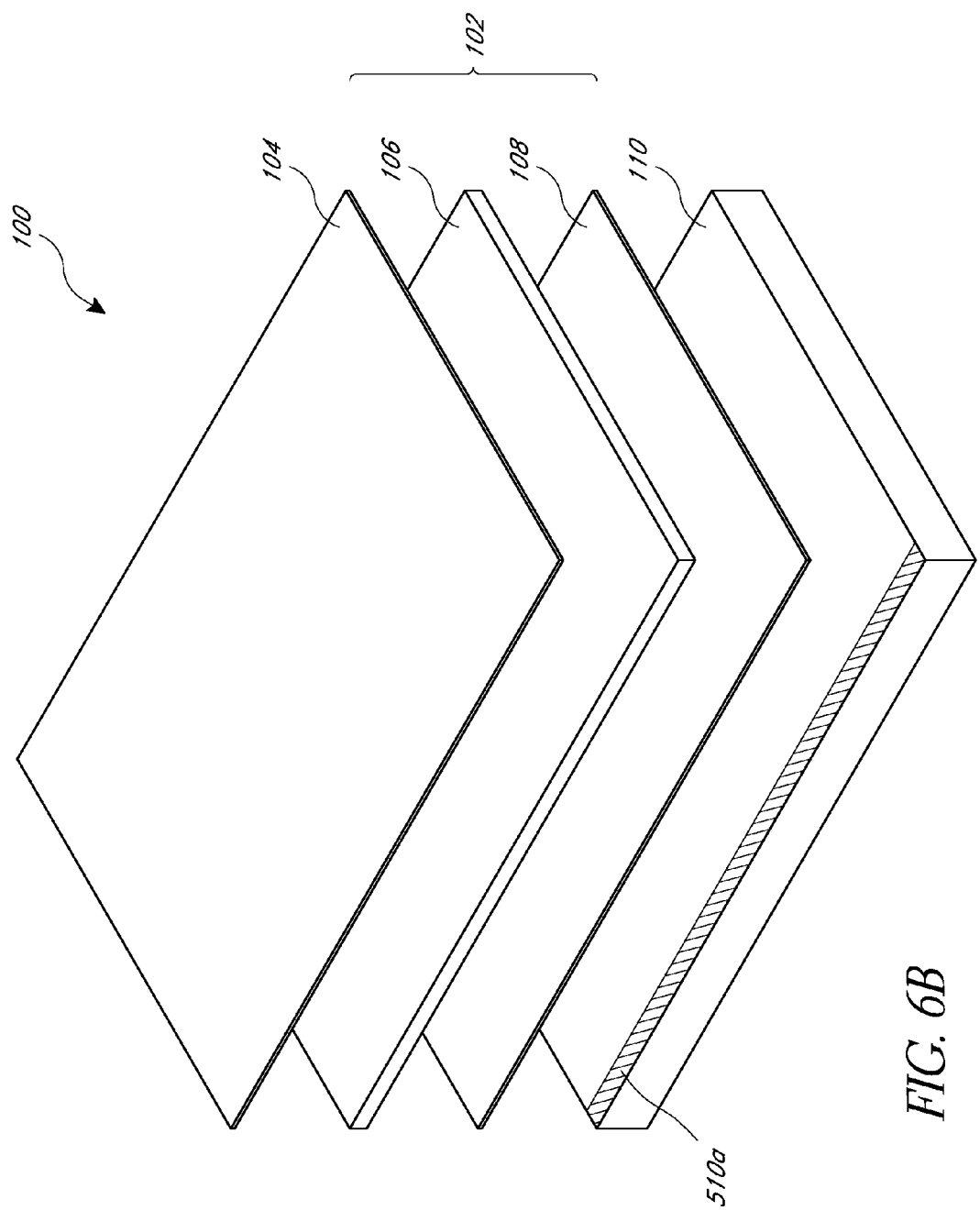
FIG. 6B is an exploded view of an embodiment of a flooring structure comprising a moisture barrier membrane.

FIG. 6A illustrates a side view of an example of the flooring structure 100 including top layer 104, bottom layer 106, liner 108 laying on top of the flooring substrate 110 and partially on top of a double-sided seam tape 510a. FIG. 6B illustrates an exploded view of the flooring structure 100 including top layer 104, bottom layer 106, liner 108, and flooring substrate 110.

Typically, loose-lay implementations can be used in circumstances where the floor covering will be removed in the future. Alternatively, these implementations can be used in circumstances in which the installer is converting an existing flooring structure or simply laying a moisture barrier membrane 102 with a new floor covering on top.

In the loose-lay method of installing the moisture barrier membrane 102, double-sided seam tape 510a can be used. Double-sided seam tape 510a can have a first side and a second side and both of the sides include adhesive. In some examples, the double-sided seam tape 510a can include a first film for protecting the first side and/or a second film for protecting the second side. The installer can remove the film(s) to expose the adhesive before applying the double-sided seam tape 510a.

In some implementations of the loose-lay method, the double-sided seam tape 510a may be applied in a similar manner to the seam tape 510 used in other methods of installation described herein. Alternatively, the double-sided seam tape 510a can be applied in a different manner depending on the type of floor covering.

For example, one implementation of the loose lay method for applying the moisture barrier membrane 102 can include bottom-seaming. Bottom-seaming can include applying a first side of the double-sided seam tape 510a to the flooring substrate 110 and attaching the bottom surface of the moisture barrier membrane 102 to the second side of the double-sided seam tape 510a. Bottom seaming can include attaching and/or adhering a bottom surface of a seam formed between two or more abutting pieces of the moisture barrier membrane 102 to the second side of the double-sided tape. Bottom seaming can be advantageous when the floor covering includes VCT, LVT, LVP, and/or other types of tiles.

In another example, an implementation of the loose lay method for applying the moisture barrier membrane 102 can include top seaming. Top-seaming can include applying a first side of the double-sided seam tape 510a to the top surface of the moisture barrier membrane 102 and attaching the bottom surface of the floor covering to the second side of the double-sided seam tape 510a. Top seaming can include attaching and/or adhering a top surface of a seam formed between two or more abutting pieces of moisture barrier membrane 102 to the second side of the double-sided tape. Top seaming can be advantageous when the floor covering includes carpet tile, engineered wood, and/or the like.

In some implementations, the moisture barrier membrane 102 can be aligned to attach to an entire area of one side of the double-sided seam tape 510a. In alternative embodiments, the moisture barrier membrane 102 can be aligned to attach and/or adhere to only a portion of the double-sided seam tape 510a. In this example, a first piece 102a of moisture barrier membrane 102 can be aligned immediately adjacent to and/or to abut a second piece 102b of moisture barrier membrane 102. In this configuration, it is advantageous to align the double-sided seam tape 510a along the seam line 508 formed between abutting pieces of moisture barrier membrane 102. Similar to the seam tape 510, the double-sided seam tape 510a can form a seal between two or more adjacent pieces of moisture barrier membrane 102. The seal, which can be held together by the double-sided seam tape 510a, can hold the pieces of moisture barrier membrane 102 in place, can have waterproofing properties, and can reduce cracking in pieces of the moisture barrier membrane 102.

Example Methods for Installing a Floor Covering

In some implementations, an installer can install floor covering over the moisture barrier membrane. Adhesives or other intermediate layers can be applied to the membrane and the floor covering installed over the intermediate layers. There are several advantages to applying the floor covering to adhesive on the moisture barrier membrane. As described above, the top layer 104 of the moisture barrier membrane can form a strong bond with the floor covering by absorbing some of the adhesive. The composition of the moisture barrier membrane 102 also can allow the installer to apply the adhesive and floor covering to the moisture barrier membrane 102 soon after the moisture barrier membrane 102 is installed. This can advantageously eliminate down time, speed up construction of the flooring structure, and/or reduce costs. In alternative implementations, the installer can wait a period of time before applying the adhesive and floor covering to the moisture barrier membrane. Also, the adhesive may advantageously reduce cracking in the flooring structure, fully secure the floor covering in a proper position, retain the floor covering in a substantially flat position, and/or reduce the effects of plasticizer migration.

During installation of a floor covering, the installer can apply an adhesive to a top surface of an appropriate bonding layer. For example, the bonding layer can form a top surface of the top layer 104 of the moisture barrier membrane 102. In this example, the moisture barrier 102 can have been previously secured to the flooring substrate 110. The bonding layer can alternatively include another moisture barrier, liner, and/or adhesive, among other materials.

The installer can apply any suitable kind of adhesive. To reduce the effects of plasticizer migration, it may be advantageous to choose an adhesive that does not include solvents, oils, and/or other chemicals. Certain adhesives may advantageously be used to enhance the strength of the bond between the floor covering and the moisture barrier membrane 102. The type of adhesive used during installation of the floor covering may also depend on several factors, including the type of moisture barrier membrane 102, method of installation of the moisture barrier membrane 102, the type of materials the adhesive will bond, the type of floor covering, the surrounding temperature and/or moisture conditions, and/or the like.

The installer can apply the adhesive in several ways. For example, the installer can spread the adhesive on the top surface of the bonding layer and/or the moisture barrier membrane 102. In other implementations, the installer can spread the adhesive directly on the flooring substrate 110. To spread the adhesive, the installer can select and/or use a trowel and/or other spreading tool. The trowel can selectively have notching that provides a pronounced ridge line.

In some examples, after the floor covering has been applied to the adhesive and/or as the floor covering is applied to the adhesive, the installer can apply the floor covering without waiting for the adhesive to cure. In other examples, the installer can allow the adhesive time to dry and/or cure. Allowing the adhesive to cure can advantageously strengthen the bond between the top surface of the bonding layer and the bottom surface of the floor covering.

Additional Examples and Aspects

In aspect one, a moisture barrier membrane for a flooring structure, can comprise a bottom layer comprising one or more of petroleum bitumen, rubber copolymer, naphthenic distillate, calcium carbonate, or plant extract; a top layer comprising a homogeneous fabric layer, the homogeneous fabric layer comprising a first ply comprising a first non-woven fabric; a central layer comprising a polymer; and a second ply comprising a second non-woven fabric, wherein the central layer is disposed between the first ply and the second ply, and wherein the first ply, the central layer, and the second ply form a unitary body; and a removable liner disposed adjacent the bottom layer, wherein a top surface of the top layer is configured to receive a floor covering.

In aspect two, the polymer of aspect one comprises one or more of polyethylene, polyurethane, ethylene vinyl acetate, polyvinylchloride, or polyethylene vinyl acetate. In aspect three, the moisture barrier membrane of any one of the first or second aspects comprises the first or the second non-woven fabric comprising one or more of polyester or fiberglass. In aspect four, the moisture barrier membrane of any one of the aspects one to three comprises the top surface which is further configured to receive an adhesive. In aspect five of the moisture barrier membrane of any one of any one of aspects one to four, the adhesive bonds the floor covering to the top layer.

In aspect six of the moisture barrier membrane of any one of any one of aspects one to five, the homogeneous fabric layer is one or more of spun-laced, spun-bound, or laminated. In aspect seven, the moisture barrier membrane of any one of aspects 1 to 6, can comprise a thickness in a range from 40 to 50 mils. In aspect eight of the moisture barrier membrane of any one of aspects 1 to 7, the top layer further comprises a top layer thickness in a range from 1 to 10 mils. In aspect nine of the moisture barrier membrane of any one of aspects 1 to 8, the moisture barrier membrane is further configured to suppress water vapor transmission of a flooring substrate comprising a relative humidity of up to 99%.

In aspect ten of the moisture barrier membrane of any one of aspects 1 to 9, the moisture barrier membrane is further configured to suppress sound transmission. In aspect 11 of the moisture barrier membrane of any one of aspects 1 to 10, the moisture barrier membrane has a perm rate in a range from 0.01 to 0.10 grain $h^{-1}$ $ft^{-2}$ in $Hg^{-1}$. In aspect 12 of the moisture barrier membrane of any one of aspects 1 to 11, the moisture barrier membrane is rolled.

In aspect 13 of the moisture barrier membrane of any one of aspects 1 to 12, the removable liner comprises one or more of nylon or polyethylene. In aspect 14 of the moisture barrier membrane of any one of aspects 1 to 13, the removable liner is removably attached to a surface of the bottom layer. In aspect 15 of the moisture barrier membrane of any one of aspects 1 to 14, the removable liner comprises a liner width and a liner length, the top layer further comprises a top width and a top length, the bottom layer further comprises a bottom width and a bottom length, the liner width is larger than a top width of the top layer and a bottom width of the bottom layer, and the liner length is larger than a top length of the top layer and a bottom length of the bottom layer. In aspect 16 of the moisture barrier membrane of any one of aspects 1 to 15, the top layer prevents migration of a plasticizer through the top layer into the bottom layer. In aspect 17 of the moisture barrier membrane of any one of aspects 1 to 16, the first non-woven fabric is the same as the second non-woven fabric.

In aspect 18, a flooring structure can comprise a flooring substrate; a moisture barrier membrane disposed above the flooring substrate, comprising: a bottom layer comprising one or more of petroleum bitumen, rubber copolymer, naphthenic distillate, calcium carbonate, or plant extract; a top layer comprising a homogeneous fabric layer, the homogeneous fabric layer comprising: a first ply comprising a first non-woven fabric; and a second ply comprising a second non-woven fabric; and a floor covering disposed above the moisture barrier membrane.

In aspect 19 of the flooring structure of aspect 18, the flooring substrate comprises one or more of concrete or wood. In aspect 20 of the flooring structure of any one of aspects 18 or 19, the first or the second non-woven fabric comprises one or more of polyester or fiberglass. In aspect 21 of the moisture barrier membrane of any one of aspects 18 to 20, the first ply and the second ply are configured to be formed by point-bond construction.

In aspect 22 of the flooring structure of any one of aspects 18 to 21, the moisture barrier membrane is configured to be laminated to form a unitary body. In aspect 23 of the flooring structure of any one of aspects 18 to 22, the moisture barrier membrane is further configured to suppress water vapor transmission in a flooring substrate comprising a relative humidity up to 99%. In aspect 24 of the flooring structure of any one of aspects 18 to 23, the moisture barrier membrane is further configured to suppress sound transmission.

In aspect 25 of the flooring structure of any one of aspects 18 to 24, the moisture barrier membrane has a perm rate in a range from 0.01 to 0.10 grain $h^{-1}$ $ft^{-2}$ in $Hg^{-1}$. In aspect 26 of the flooring structure of any one of aspects 18 to 25, the flooring structure further comprises an adhesive disposed between the top layer and the floor covering. In aspect 27 of the flooring structure of claim 26, the adhesive bonds the top layer to the floor covering. In aspect 28 of the flooring structure of any one of aspects 18 to 27, the floor covering further comprises one or more of ceramic tile, vinyl, linoleum, or rubber tile.

In aspect 29 of the flooring structure of any one of aspects 18 to 28, further the flooring structure further comprises a liner disposed between the flooring substrate and the bottom layer. In aspect 30 of the flooring structure of claim 29, the liner is removable. In aspect 31 of the flooring structure of any one of aspects 29 or 30, the liner comprises one or more of nylon or polyethylene.

In aspect 32 of the flooring structure any one of aspects 29 to 31, the liner is removably attached to a surface of the bottom layer. In aspect 33 of the flooring structure of any one of aspects 18 to 32, the liner comprises a liner width and a liner length, the top layer further comprises a top width and a top length, the bottom layer further comprises a bottom width and a bottom length, the liner width is larger than a top width of the top layer and a bottom width of the bottom layer, and the liner length is larger than a top length of the top layer and a bottom length of the bottom layer. In aspect 34 of the flooring structure of any one of aspects 18 to 33, the moisture barrier membrane further comprises a central layer comprising a polymer, the central layer is disposed between the first ply and the second ply, and the first ply, the central layer, and the second ply form a unitary body.

In aspect 35 of the flooring structure of any one of aspects 18 to 34, the homogeneous fabric layer is one or more of spun-laced, spun-bound, or laminated. In aspect 36 of the flooring structure of any one of aspects 18 to 35, the moisture barrier membrane further comprises a thickness, the thickness comprising a range from 40 to 50 mils. In aspect 37 of the flooring structure of any one of aspects 18 to 36, the top layer further comprises a top layer thickness, the top layer thickness comprising a range from 4 to 4.5 mils.

In aspect 38 of the flooring structure of any one of aspects 18 to 37, the top layer of the moisture barrier membrane prevents migration of plasticizer through the top layer into the bottom layer. In aspect 39 of the flooring structure of any one of aspects 18 to 38, the first non-woven fabric is the same as the second non-woven fabric.

In aspect 40, a method of installing a flooring structure can comprise: preparing a flooring substrate; applying a moisture barrier membrane to a top surface of the flooring substrate, applying the moisture barrier membrane comprising: unrolling, at a distance from a first wall, a first piece of the moisture barrier membrane, the moisture barrier membrane comprises a first side and a second side, the first side is spaced at a shorter distance away from the first wall than the second side, and the moisture barrier membrane comprises: a bottom layer comprising one or more of petroleum bitumen, rubber copolymer, naphthenic distillate, calcium carbonate, or plant extract; and a top layer comprising a homogeneous fabric layer, the homogeneous fabric layer comprising: a first ply comprising a non-woven fabric; and a second ply comprising a second non-woven fabric; and a liner; folding the first side of the first piece onto the second side of the first piece; removing the liner from the first side to expose the bottom layer; unfolding the first side of the first piece; bonding the first side of the first piece to the flooring substrate comprising pressing the first side of the first piece onto the flooring substrate; aligning a second piece of the moisture barrier membrane adjacent to the first piece, the second piece comprising a third side and a fourth side, the third side is disposed at a shorter distance from the first wall than the fourth side; forming a seamline between the first piece and the second piece comprising: creating an overlapped portion of the second piece, the creating an overlapped portion comprising overlapping the first piece and the second piece; and cutting the overlapped portion; folding the third side of the second piece and the second side of the first piece away from the seamline; attaching a seam tape to the flooring substrate along the seamline; removing the liner from the second side to expose the bottom layer; bonding the second side of the first piece to the flooring substrate, bonding comprising pressing the second side of the first piece onto a portion of the seam tape and a portion of the seam tape; securing the moisture barrier membrane comprising rolling the first piece of the moisture barrier membrane with a roller; applying a floor covering comprising: applying an adhesive to a top surface of the moisture barrier membrane; and applying the floor covering to the adhesive, the adhesive bonds the top surface of the moisture barrier membrane to the floor covering.

In aspect 41 of the method of aspect 40, preparing the flooring substrate can further comprise: determining one or more moisture conditions of the flooring substrate, the one or more moisture conditions comprises a relative humidity; testing the relative humidity using one or more of an RH probe or a Wagner Rapid RH kit; repairing the flooring substrate, the repairing comprising one or more of: patching the flooring substrate; leveling the flooring substrate; or curing the flooring substrate, the curing comprising drying the flooring substrate a period of time after patching, priming the flooring substrate, the priming comprising applying a primer, the primer comprises a water-based latex primer; and preparing the flooring substrate further comprising removing a residual substance, the residual substance comprising one or more of a contaminant, an adhesive, or a solvent.

In aspect 42 of the method of aspect 40, preparing the flooring substrate can further comprise determining one or more moisture conditions of the flooring substrate, the one or more moisture conditions comprises a relative humidity. In aspect 43 of the method of aspect 42, determining one or more moisture conditions further comprises testing the relative humidity using one or more of an RH probe or a Wagner Rapid RH kit.

In aspect 44 of the method of any one of aspects 40 or aspects 42 to 43, preparing the flooring substrate further comprises repairing the flooring substrate, the repairing comprising one or more of: patching the flooring substrate; leveling the flooring substrate; or curing the flooring substrate, the curing comprising drying the flooring substrate a period of time after patching. In aspect 45 of the method of any one of aspects 40 or aspects 42 to 44, preparing the flooring substrate further comprises priming the flooring substrate, the priming comprising applying a primer, the primer comprises a water-based latex primer.

In aspect 46 of the method of aspect 45, priming the flooring substrate further comprises drying the primed flooring substrate for a period of time. In aspect 47 of the method of any one of aspects 40 or aspects 42 to 46, preparing the flooring substrate further comprises removing a residual substance, the residual substance comprising one or more of a contaminant, an adhesive, or a solvent.

In aspect 48 of the method of any one of aspects 40 to 47, the method further comprises acclimating the moisture barrier membrane to at least a room temperature for an acclimation time. In aspect 49 of the method of aspect 48, the room temperature comprises a temperature of at least 65° F. In aspect 50 of the method of any one of aspects 48 to 49, the acclimation time comprises at least four hours. In aspect 51 of the method of any one of aspects 40 to 50, the distance from the first wall comprises ⅛ inches.

In aspect 52 of the method of any one of aspects 40 to 51, the roller weighs at least 100 pounds. In aspect 53 of the method of any one of aspects 40 to 52, the first or the second non-woven fabric comprises one or more of polyester or fiberglass. In aspect 54 of the method of any one of aspects 40 to 53, the first ply and the second ply are configured to be formed by point-bond construction. In aspect 55 of the method of any one of aspects 40 to 54, the moisture barrier membrane is configured to be laminated to form a unitary body.

In aspect 56 of the method of any one of aspects 40 to 55, the moisture barrier membrane is further configured to suppress water vapor transmission in a flooring substrate comprising a relative humidity up to 99%. In aspect 57 of the method of any one of aspects 40 to 56, the moisture barrier membrane is further configured to suppress sound transmission. In aspect 58 of the method of any one of aspects 40 to 57, the moisture barrier membrane has a perm rate in a range from 0.01 to 0.10 grain $h^{-1}$ $ft^{-2}$ in $Hg^{-1}$.

In aspect 59 of the method of any one of aspects 40 to 58, the moisture barrier membrane further comprises a central layer comprising a polymer, the central layer is disposed between the first ply and the second ply, and the first ply, the central layer, and the second ply form a unitary body. In aspect 60 of the method of any one of aspects 40 to 53 or 55 to 59, the homogeneous fabric layer is one or more of spun-laced, spun-bound, or laminated. In aspect 61 of the method of any one of aspects 40 to 60, the moisture barrier membrane further comprises a thickness, the thickness comprising a range from 40 to 50 mils.

In aspect 62 of the method of any one of aspects 40 to 61, the top layer further comprises a top layer thickness, the top layer thickness comprising a range from 4 to 4.5 mils. In aspect 63 of the method of any one of aspects 40 to 62, the top layer of the moisture barrier membrane prevents migration of plasticizer through the top layer into the bottom layer.

In aspect 64 of the method of any one of aspects 40 to 63, the first non-woven fabric is the same as the second non-woven fabric.

In aspect 65, a method of installing a flooring structure can comprise: preparing a flooring substrate; applying a moisture barrier membrane to a top surface of the flooring substrate, applying the moisture barrier membrane comprising: unrolling, at a distance from a first wall, a first piece of the moisture barrier membrane, wherein the moisture barrier membrane comprises: a bottom layer comprising one or more of petroleum bitumen, rubber copolymer, naphthenic distillate, calcium carbonate, or plant extract; and a top layer comprising a homogeneous fabric layer, the homogeneous fabric layer comprising: a first ply comprising a first non-woven fabric; and a second ply comprising a second non-woven fabric; and a liner; aligning a second piece of the moisture barrier membrane adjacent to the first piece; forming a seamline between the first piece and the second piece comprising: creating an overlapped portion of the second piece, the creating an overlapped portion comprising overlapping the first piece and the second piece; and cutting the overlapped portion; lifting the first piece and the second piece; attaching a seam tape to the seamline, wherein the seam tape has two sticky sides; bonding the first piece and the second piece to the seam tape comprising pressing the first piece onto a first portion of the seam tape and the second piece onto a second portion of the seam tape; securing the moisture barrier membrane comprising rolling the first piece of the moisture barrier membrane with a roller; and applying a floor covering comprising: applying an adhesive to a top surface of the moisture barrier membrane; and applying the floor covering to the adhesive, wherein the adhesive bonds the top surface of the moisture barrier membrane to the floor covering.

In aspect 66, a method of installing a flooring structure can comprise: preparing a flooring substrate; applying a moisture barrier membrane to a top surface of the flooring substrate, applying the moisture barrier membrane comprising: unrolling, at a distance from a first wall, a moisture barrier membrane, wherein the moisture barrier membrane comprises: a bottom layer comprising one or more of petroleum bitumen, rubber copolymer, naphthenic distillate, calcium carbonate, or plant extract; and a top layer comprising a homogeneous fabric layer, the homogeneous fabric layer comprising: a first ply comprising a first non-woven fabric; and a second ply comprising a second non-woven fabric; and a liner; attaching a seam tape to the flooring substrate along a first edge of the moisture barrier membrane; removing the liner from the moisture barrier membrane to expose the bottom layer; bonding the moisture barrier membrane to the flooring substrate and at least a portion of the seam tape comprising pressing the moisture barrier membrane onto the flooring substrate; securing the moisture barrier membrane comprising rolling the moisture barrier membrane with a roller; and applying a floor covering comprising: applying an adhesive to a top surface of the moisture barrier membrane; and applying the floor covering to the adhesive, wherein the adhesive bonds the top surface of the moisture barrier membrane to the floor covering.

CONCLUSION

Depending on the embodiment, certain actions or events or stages of any of the processes or methods described herein can be performed in a different sequence, re-arranged, merged, or left out altogether. Actions or events or stages may be added to embodiments of the processes or methods.

Thus, in certain embodiments, not all described actions or events or stages are necessary for the practice of the processes or methods. Moreover, in certain embodiments, actions or events or stages may be performed concurrently, rather than sequentially, and no specific ordering in time for the actions or events or stages is to be inferred unless specifically stated otherwise. In any apparatus, system, structure, composition, or method, no element, feature, action, or event is necessary or indispensable to all embodiments, and the disclosed apparatus, systems, structures, compositions and methods can be arranged differently than shown or described.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or actions. Thus, such conditional language is not generally intended to imply that features, elements and/or actions are in any way required for every embodiment. The terms "comprising," "including," "having," and the like are synonymous and are used inclusively, in an open-ended fashion, and do not exclude additional elements, features, actions, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The articles "a" or "an" or "the" when referring to an element means one or more of the element, unless the context clearly indicates otherwise.

Any thicknesses shown in the drawings are for illustrative purposes and may not be representative of any actual material used or any results that may occur during use of the methods, devices, and systems described herein. Furthermore, it will be understood that the drawings may not be to scale.

While the above detailed description has shown, described, and pointed out novel features as applied to various embodiments, it will be understood that various omissions, substitutions, and changes in the form and details of the apparatus, structures, and methods illustrated may be made without departing from the spirit of the disclosure. Certain embodiments of the inventions described herein may be embodied within a form that does not provide all of the features and benefits set forth herein, as some features or benefits may be used or practiced separately from others.

What is claimed is:

1. A moisture barrier membrane for a flooring structure, the moisture barrier membrane comprising:
    a bottom layer comprising one or more of petroleum bitumen, rubber copolymer, naphthenic distillate, calcium carbonate, or plant extract, wherein the bottom layer has a bottom adhesive surface;
    a top layer disposed adjacent the bottom layer, the top layer comprising a homogeneous fabric layer, wherein the homogeneous fabric layer comprises:
        a first ply comprising a first non-woven fabric;
        a central layer comprising a polymer; and
        a second ply comprising a second non-woven fabric, wherein the central layer is disposed between the first ply and the second ply, and wherein the first ply, the central layer, and the second ply form a unitary body; and
    a peelable liner disposed adjacent the bottom layer such that the peelable liner directly contacts the bottom adhesive surface, wherein the peelable liner is configured to be peeled away from the bottom layer and expose the bottom adhesive surface of the bottom layer,
    wherein a top surface of the top layer is configured to receive a floor covering configured to be applied entirely above the top surface,
    wherein the top layer and the bottom layer form a unitary body that is configured to be applied to a flooring substrate,
    wherein the top layer and the bottom layer are configured to be bonded before application to the flooring substrate,
    wherein the top layer is configured to receive an adhesive after application to the flooring substrate,
    wherein the adhesive comprises a material that is different from the bottom layer, and
    wherein the moisture barrier membrane has a perm rate in a range from 0.005 to 0.05 grain $h^{-1}$ $ft^{-2}$ in $Hg^{-1}$.

2. The moisture barrier membrane of claim 1, wherein the polymer comprises one or more of polyethylene, polyurethane, ethylene vinyl acetate, polyvinylchloride, or polyethylene vinyl acetate.

3. The moisture barrier membrane of claim 1, wherein the first or the second non-woven fabric comprises one or more of polyester or fiberglass.

4. The moisture barrier membrane of claim 1, wherein the homogeneous fabric layer is a spun-laced layer, a spun-bound layer, or a laminated layer.

5. The moisture barrier membrane of claim 1, wherein the moisture barrier membrane is further configured to suppress water vapor transmission of a flooring substrate comprising a relative humidity of up to 99%.

6. The moisture barrier membrane of claim 1, wherein the top layer prevents migration of a plasticizer through the top layer into the bottom layer.

7. The moisture barrier membrane of claim 1, wherein the top layer comprises a bonding layer comprising an adhesive.

8. The moisture barrier membrane of claim 7, wherein the bonding layer further comprises a peelable liner configured to be peeled away from the bonding layer and expose the bonding layer.

9. The moisture barrier membrane of claim 1, wherein the bottom layer comprises petroleum bitumen, rubber copolymer, naphthenic distillate, calcium carbonate, and plant extract.

10. The moisture barrier membrane of claim 1, wherein the moisture barrier membrane is configured to suppress moisture vapor emission flowing in a direction away from the flooring substrate.

11. A flooring structure, the flooring structure comprising:
    (1) a flooring substrate comprising one or more of concrete or wood;
    (2) a moisture barrier membrane disposed above the flooring substrate, the moisture barrier membrane comprising:
        a bottom layer comprising one or more of petroleum bitumen, rubber copolymer, naphthenic distillate, calcium carbonate, or plant extract, wherein the bottom layer further comprises a bottom adhesive surface configured to directly attach to the flooring substrate; and a top layer disposed adjacent the bottom layer, the top layer comprising a homogeneous fabric layer, wherein the homogeneous fabric layer comprises:
a first ply comprising a first non-woven fabric; and
a second ply comprising a second non-woven fabric;
(3) a floor covering disposed entirely above the moisture barrier membrane; and
(4) an adhesive disposed at least partially between the moisture barrier membrane and the floor covering, wherein the adhesive is configured to be applied to a top surface of the top layer after the moisture barrier membrane adheres to the flooring substrate, and wherein the adhesive comprises a material that is different from the bottom layer of the moisture barrier membrane,
wherein the moisture barrier membrane forms a unitary body that is configured to be applied to the flooring substrate,
wherein the top layer and the bottom layer are configured to form the unitary body before application to the flooring substrate, and
wherein the moisture barrier membrane has a perm rate in a range from 0.005 to 0.05 grain $h^{-1}$ $ft^{-2}$ in $Hg^{-1}$.

12. The flooring structure of claim 11, wherein the first or the second non-woven fabric comprises one or more of polyester or fiberglass.

13. The flooring structure of claim 11, wherein the moisture barrier membrane is further configured to suppress water vapor transmission in a flooring substrate comprising a relative humidity up to 99%.

14. The flooring structure of claim 11, further comprising a peelable liner disposed between the flooring substrate and the bottom layer.

15. The flooring structure of claim 11, wherein the moisture barrier membrane further comprises a central layer comprising a polymer, wherein the central layer is disposed between the first ply and the second ply, and wherein the first ply, the central layer, and the second ply form a unitary body.

* * * * *